United States Patent
Takayanagi et al.

(10) Patent No.: US 8,814,327 B2
(45) Date of Patent: Aug. 26, 2014

(54) POWER SUPPLY APPARATUS AND PRINTING APPARATUS

(75) Inventors: Yoshiaki Takayanagi, Yokohama (JP); Takashi Kasahara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 49 days.

(21) Appl. No.: 13/523,149

(22) Filed: Jun. 14, 2012

(65) Prior Publication Data

US 2013/0002746 A1 Jan. 3, 2013

(30) Foreign Application Priority Data

Jul. 1, 2011 (JP) ................ 2011-147737

(51) Int. Cl.
 *B41J 2/045* (2006.01)
 *H02M 3/335* (2006.01)
 *B41J 29/38* (2006.01)
 *H02M 1/00* (2006.01)

(52) U.S. Cl.
 CPC .... *H02M 3/33523* (2013.01); *H02M 2001/009* (2013.01); *B41J 29/38* (2013.01)
 USPC .............................. 347/58; 347/62

(58) Field of Classification Search
 USPC ................... 347/10, 11, 57–58, 62
 See application file for complete search history.

(56) References Cited

U.S. PATENT DOCUMENTS

| | | | |
|---|---|---|---|
| 4,660,136 A | 4/1987 | Montorefano | |
| 4,680,688 A | 7/1987 | Inou et al. | |
| 4,999,759 A | 3/1991 | Cavagnolo | |
| 5,285,368 A | 2/1994 | Ishikawa | |
| 6,370,040 B2 | 4/2002 | Hosotani et al. | |
| 7,712,891 B2 | 5/2010 | Ishida et al. | |
| 8,678,549 B2 | 3/2014 | Silverbrook et al. | |
| 2004/0257838 A1 | 12/2004 | Gan et al. | |
| 2012/0127760 A1 | 5/2012 | Hosono | |

FOREIGN PATENT DOCUMENTS

| | | |
|---|---|---|
| CN | 85107730 A | 8/1986 |
| CN | 2803705 Y | 8/2006 |
| CN | 1906037 A | 1/2007 |
| DE | 60101234 T2 | 9/2004 |
| EP | 1128537 A2 | 8/2001 |
| EP | 2001114 A1 | 12/2008 |
| GB | 2166270 A | 4/1986 |
| JP | 58-019921 A | 2/1983 |
| JP | 6-178537 | 6/1994 |

OTHER PUBLICATIONS

UK Combined Search and Examination Report dated Nov. 9, 2012 in corresponding British Application No. 1211224.9.
Chinese Office Action dated Apr. 1, 2014 from counterpart Chinese Application No. 201210228371.6.

*Primary Examiner* — Lamson Nguyen
(74) *Attorney, Agent, or Firm* — Fitzpatrick, Cella, Harper & Scinto

(57) ABSTRACT

The power supply includes a transformer for generating a first output voltage by a first secondary winding, and a superimposing voltage by a second secondary winding, and a driver. Furthermore, the circuit includes first and second rectifying and smoothing circuits for respectively rectifying and smoothing the first output voltage and superimposing voltage, and an adder for adding the rectified and smoothed superimposing voltage on the rectified and smoothed first output voltage to output a second output voltage. The first and second output voltages are fed back respectively by DC coupling, the fed-back first and second output voltages are respectively adjusted by first and second feedback factors, and the adjusted feedback components are combined and amplified to be applied to the driver for PWM-control.

15 Claims, 15 Drawing Sheets

_US 8,814,327 B2_

POWER SUPPLY APPARATUS AND PRINTING APPARATUS

BACKGROUND OF THE INVENTION

1. Field of the Invention

The present invention relates to a power supply apparatus and a printing apparatus. Particularly, the present invention relates to a power supply apparatus and a printing apparatus which prints an image on a print medium using an inkjet printhead, and using the power supply apparatus.

2. Description of the Related Art

Inkjet printers as computer peripheral devices have developed to multi-function printers including scanner and copy functions, and also a FAX function in recent years, and have higher degrees of penetration into the market year by year due to their higher cost performance ratios.

In general, a switching power supply is used as a power supply of an inkjet printer. A conventional dropper type power supply, which operates at a commercial frequency (50/60 Hz), is falling out of use since it is inferior in terms of power conversion efficiency, heat generation, and the like.

Switching power supplies are classified into some types based on their switching methods, and a flyback method is most popularly used in terms of its simple circuit arrangement and cost. Recently, many control ICs exclusively used for such flyback method have been provided from respective manufacturers, and a circuit having high reliability can be designed relatively easily.

FIG. 8 is a circuit diagram showing an example of a conventional switching power supply using the flyback method. In this example, an IC 1 is a commercially available PWM (Pulse Width Modulation) control IC, and implements feedback control of a current mode. An outline of the operation of the circuit shown in FIG. 8 will be described below.

An input voltage of a commercial frequency of 50 Hz or 60 Hz is rectified by a bridge diode BD1, and is then smoothed by an electrolytic capacitor C1 to generate a DC voltage Vin (DC). This DC voltage Vin(DC) is about 140 V in Japan, or is about 320 V in a 230-V region in Europe and the like. This DC voltage Vin(DC) is supplied to a transformer T1, and undergoes switching control by a transistor Q1. As a result, an energy accumulated on a primary side winding 11 of the transformer T1 is transferred to a secondary side winding 12, thereby generating a DC output voltage Vo.

More specifically, in the flyback method, an energy is accumulated on the primary side winding 11 (n1: the number of windings) of the transformer during a turn-on period of the transistor Q1 in FIG. 8, and the accumulated energy is transferred to the secondary side winding 12 (n2: the number of windings) during an off period of the transistor Q1. The energy transferred to the secondary side winding 12 in this way is rectified and smoothed by a diode D2 and electrolyte capacitor C4 to generate the DC output voltage Vo. The output voltage Vo is voltage-divided by resistors R6 and R7, and a divided voltage (a voltage of a node Vref1) is input to a reference terminal (REF) of a constant voltage regulator, that is, a so-called shunt regulator IC 3. FIGS. 15A and 15B are explanatory circuit diagrams of the shunt regulator IC 3. The shunt regulator IC 3 is one kind of so-called error amplifiers. In the example of FIG. 8, a cathode (K) is connected to a photocoupler IC 2, and an anode (A) is connected to ground. Therefore, an anode voltage Va is 0 V. The shunt regulator IC 3 has an error amplifier (comparator) 151 and a fixed reference voltage circuit 152 arranged in the regulator. The shunt regulator IC 3 compares a voltage of the node Vref1 input to the reference terminal (REF) with an output voltage of the fixed reference voltage circuit 152, and outputs a voltage Vk. In this example, the fixed reference voltage circuit generates 2.5 V. The cathode voltage Vk as an output voltage of the regulator IC 3 is controlled, so that the reference voltage Vref1 input to the reference terminal (REF) of the IC 3 always becomes DC 2.5 V, thus achieving feedback control. Please refer to specialized books and the like for the detailed operation of the shunt regulator since it is well known in this art, and a description thereof will not be given. Note that symbols R1, R2, R3 and R5 in FIG. 8 are resisters, C2 is another electrolytic capacitor.

For example, when the output voltage Vo rises, and the input voltage Vref1 of the shunt regulator IC 3 consequently rises, the output Vk of the shunt regulator IC 3 drops conversely. As a result, a current which flows through a resistor R9 and an LED 15 of the photocoupler IC 2 increases. Then, a collector current which flows through a phototransistor 16 of the photocoupler IC 2 increases, and a potential of a feedback terminal FB of the control IC 1 drops. Then, finally, a pulse width, in other words, an ON duty of a PWM signal output from a DRV terminal of the control IC 1 drops, and a turn-on time of the transistor Q1 is consequently shortened (conversely, a turn-off time is prolonged). As a result, an energy accumulated on the primary side winding 11 of the transformer decreases, that to be transferred to the secondary side winding 12 decreases accordingly, and the output voltage Vo drops finally.

In this way, when the output voltage Vo rises, the feedback control effects to cancel it. Conversely, when the output voltage Vo drops, the feedback control effects to raise that voltage, thereby obtaining the stable DC output voltage Vo. More specifically, a circuit bounded by a broken line 14 in FIG. 8 is a control circuit which is responsible for gain adjustment and phase adjustment required for such feedback control, and functions to stably operate the entire system. The control circuit 14 has an input node 14in and output node 14out. More specifically, a resistor R8 and capacitor C5 in the broken line 14 serve as such gain and phase adjustment parameters. Note that hereinafter, the circuit portion bounded by the broken line 14 will be referred to as an error amplifier.

The description will be further continued with reference to FIG. 8. The transformer T1 includes an auxiliary winding 13, which is used to generate a power supply voltage Vcc for the control IC 1. More specifically, a voltage generated by the auxiliary winding 13 is rectified and smoothed by a diode D1 and electrolyte capacitor C3, and is further stepped down by a transistor Q2 and Zener diode ZD1, thus generating the power supply voltage Vcc of the control IC 1. In the example of FIG. 8, Vcc=15 V, and hence, the Zener diode ZD1 also has a 15-V specification. Note that the control IC 1 is connected to the transistor Q1 via a resistor R4, and has a CS terminal required to detect a current flowing through the transistor Q1 and an HV terminal required to detect a voltage Vin (DC).

FIG. 9 is a block diagram showing an outline of the feedback control of the switching power supply shown in FIG. 8.

As shown in FIG. 9, a PWM control unit 80 including a dedicated IC and the like normally supplies a PWM control signal 81 to a driver 82 including a switching element (Q1), and the driver 82 drives a transformer 83. As a result, an energy is transferred to the output side of the transformer 83, and an output voltage Vo1 is generated via a rectifying and smoothing circuit 84 in the example shown in FIG. 8.

A framework of the feedback control will be described below with reference to FIG. 8 again. A voltage variation of the output voltage Vo1 is detected as a feedback current If1(dc). In the circuit shown in FIG. 8, the current If1(dc) is given by:

$$If1(dc)=(Vo1-Vref)/R6 \qquad (1)$$

where Vref is a reference voltage of the reference terminal (REF) of the shunt regulator IC 3, and is, for example, DC 2.5 V. This feedback current If1(dc) flows into the reference node Vref1. On the other hand, a current Iref1 which flows out from the node Vref1 is given by:

$$Iref1=Vref/R7 \qquad (2)$$

Then, since the entire system is controlled so that If1(dc) and Iref1 become equal to each other, equation (3) is obtained from equations (1) and (2). That is, we have:

$$Vo1=(R6+R7)/R7*Vref \qquad (3)$$

In this way, the output voltage Vo1 is controlled based on equation (3).

Referring back to FIG. 9, the description will be continued. A feedback factor α1 corresponds to a coefficient when the output Vo1 is considered as a variable in equation (1) which defines the feedback current If1(dc), and is 1/R6. A degree D(α1) at which the feedback factor α1 contributes to the feedback control is 1.0. This is because the circuit shown in FIG. 8 includes only one output as a feedback control target. By contrast, as will be described later, in case of a power supply having two outputs, since contributions of feedback factors are weighted between the two outputs, degrees D(αn) assume values which satisfy 0<D(αn)<1 (n=1, 2). Referring back to FIG. 9, the feedback signal weighted by a weighting circuit 86 is input to an error amplifier 89, and its output is provided to the PWM control unit 80, thus executing the aforementioned PWM control.

Details of the operation of the switching power supply shown in FIG. 8 will be described below with reference to waveforms of the respective units.

FIG. 10 is a signal waveform chart showing a drain-source voltage Vds and drain current Id of the transistor Q1, a current which flows through the secondary side winding 12 of the transformer, that is, a current Is which flows through the rectifier diode D2, and an output current Io in the switching power supply.

Note that FIG. 10 shows, as a representative example, waveforms of a current-discontinuous mode of the flyback method. Note that as is apparent to an ordinary skilled person in the art, when a load power increases, and a PWM ON duty becomes equal to or higher than 50%, the current-discontinuous mode set so far transits to a current-continuous mode. However, such mode transition is not directly related to the gist of the present invention, and a description thereof will not be given.

In FIG. 10, a basic cycle T of a switching operation is, for example, 16.7 μsec when the operation frequency is 60 kHz. This cycle includes a period Ton in which the transistor Q1 is turned on, and a period Toff in which the transistor Q1 is turned off. Furthermore, the period Toff includes a period Toff1 in which an energy is discharged from the secondary side winding 12 of the transformer via the diode D2 and electrolyte capacitor C4, and a standby period Toff2 after discharging is complete and until the transistor Q1 is turned on again. In the period Toff2, as can be seen from FIG. 10, the drain-source voltage of the transistor Q1 resonates. This is a phenomenon generally caused by a resonance system formed by an inductance value $L_1$ of the primary side winding 11 of the transformer, a leakage inductance value Lleak, and a total capacitance value Clump between the drain and source of the transistor Q1. However, since this phenomenon is not directly related to the gist of the present invention, a detailed description thereof will not be given.

In the current-discontinuous mode shown in FIG. 10, an energy is accumulated on the primary side winding 11 of the transformer during the period Ton. This energy is given by:

$$P_1=1/2*L_1*Ip^2 \qquad (4)$$

where $L_1$ is an inductance value of the primary side winding 11, and Ip is a peak value of a current which flows through the primary side winding 11 during the period Ton, as shown in FIG. 10.

Next, an energy generated by the transformer per unit time is described by:

$$P_2=1/2*L_1*Ip^2*f*\eta \qquad (5)$$

where f is a switching frequency, and η indicates energy conversion efficiency of the transformer. A product of the energy amount $P_1$ generated on the primary side of the transformer and the efficiency η is an energy amount which is actually transferred to the secondary side of the transformer. For example, f is 60 kHz, 100 kHz, or the like, and η is 0.95 or the like.

That is, about 95% of the energy generated on the primary side of the transformer is transferred to the secondary side, and the remaining 5% is dissipated as heat by a core and the windings of the transformer. Note that for reference, the total efficiency of a switching power supply of the flyback method of several ten W output is about 85%. In addition to the aforementioned dissipation by the transformer alone, that by an EMI filter circuit (not shown) of an input unit, that by the switching element Q1, that by the rectifier D2 in the secondary side circuit, that by resistors in the circuit shown in FIG. 8, and the like are included.

The description will be continued with reference to FIG. 10 again. In equation (4), the energy $P_1$ accumulated during the period Ton is transferred to the secondary side winding 12 of the transformer during the period Toff1. This switching control method will be referred to as a flyback method hereinafter. By contrast, a method in which an energy is transferred from the primary side to the secondary side of the transformer during the period Ton of the transistor Q1 is available, and will be referred to as a forward method hereinafter. Please refer to specialized books for details of the forward method.

In the circuit shown in FIG. 8, one output Vo (for example, DC 24 V) is generated as an output voltage. However, in an inkjet printer, as shown in, for example, FIG. 11, the output voltage Vo is supplied to a printhead 3 and motor driver 44, and is also supplied to a DC-DC converter 45 which is used to generate several types of logic circuit voltages.

FIG. 11 is a block diagram showing the arrangement of a power supply unit of the inkjet printer.

These logic circuit voltages include, for example, DC 1.5 V used as voltages of a CPU and ASIC core, DC 3.3 V supplied to an ASIC input/output unit (I/O) and memory device, DC 5V supplied to sensors and a display unit, and the like. Note that as shown in FIG. 11, motors connected to the motor driver 44 include a conveyance motor M2, and a carriage motor M1 which drives a carriage which mounts the printhead 3 and is scanned. Furthermore, in a recent multi-function printer (MFP), the motors include a scanner (SC) motor M3 used to scan a scanner unit and the like. In order to meet a recent power-saving requirement, an energy-saving control signal (Esave) required to guide a power supply circuit 42 to intermittent oscillations in a standby state or sleep state of a printer is normally included.

In the arrangement example shown in FIG. 11, both of a driving voltage of the printhead 3 and a voltage of the motor driver 44 are indicated by one output voltage DC 24 V. However, due to recent high-speed trends of printers, a case in which higher voltages DC 27 V, DC 32 V, and the like are used as a motor driving voltage is increasing. In such case, two outputs, that is, a printhead driving voltage (DC 24 V) and motor driving voltage (for example, DC 32 V) are generated.

FIG. 12 is a circuit diagram showing an example of a switching power supply having two output voltages. The same symbols and the same reference numerals in FIG. 12 denote components common to FIG. 8.

A major difference from the circuit shown in FIG. 8 lies in that two types of output voltages Vo1 and Vo2 are generated. For example, the output Vo1 is DC 24 V corresponding to a head driving voltage, and the output Vo2 is DC 32 V corresponding to a motor driving voltage. In order to generate these two types of output voltages, two windings 12 (n2: the number of windings) and 12a (n3: the number of windings) are provided to the secondary side of a transformer T9, so that the output voltage Vo1 is generated from the winding 12 (n2: the number of windings), and the output voltage Vo2 is generated from the winding 12a (n3: the number of windings). Note that symbols Is1, Is2 represent the output current from the windings 12, 12a, respectively. As is apparent to an ordinary skilled person in this art, the windings 12 and 12a may be configured via an intermediate tap 51 (the windings 12 and 12a share a specific pin terminal of the transformer), or the respective windings may be independently wound.

As a rectifying and smoothing circuit from the added winding 12a, a diode D51 and electrolyte capacitor C51 are arranged. To the input terminal (REF) of the shunt regulator IC 3, a feedback from the output voltage Vo2 is input in addition to that from the output voltage Vo1. In this case, the feedback from the output voltage Vo1 is attained by DC coupling via the resistor R6, but that from the output voltage Vo2 is attained by AC coupling by means of a resistor R51 and capacitor C52 (a broken line 52 in FIG. 12).

This is because since the output voltage Vo1 is used as a driving voltage of the printhead, as described above, very high precision control is required, while since the output voltage Vo2 is a voltage used to drive a DC motor and the like, variations to some extent are tolerated. Therefore, as for the output voltage Vo2, the feedback by means of the AC coupling is used so as to avoid an extreme voltage drop at a timing at which a large current is instantaneously supplied (for example, a motor activation timing). In other words, in the example of the circuit shown in FIG. 12, the feedback of the output voltage Vo1 is always prioritized. On the other hand, as for the output voltage Vo2, feedback control according to a feedback factor decided by a CR time constant of the resistor R51 and capacitor C52 is implemented only for instantaneously large load variations.

Note that Japanese Patent Laid-Open No. 6-178537 is available as an example of a related art associated with feedback control of a switching power supply which generates two output voltages.

Japanese Patent Laid-Open No. 6-178537 discloses a method of selecting an output voltage used as a feedback control target in accordance with respective load currents of a plurality of output voltages. According to Japanese Patent Laid-Open No. 6-178537, an output voltage with a larger load current is selected to execute feedback control.

However, the conventional circuit shown in FIG. 12 suffers the following problems. That is, since the feedback of the output voltage Vo2 is attained by the AC coupling, even though a printhead driving operation is normally set in a quiescent period during, for example, a high-speed print medium conveyance execution period in a print operation sequence, the feedback of the printhead voltage Vo1 is unwantedly prioritized. For this reason, the motor driving voltage Vo2 largely varies consequently, thus adversely influencing motor servo-control. Thus, in practice, high-speed control of motors is implemented within a range in which stability of such servo-control is maintained in the conventional circuit.

On the other hand, in the circuit shown in FIG. 12, the feedback of the output Vo2 corresponding to the motor driving voltage may also be attained by DC coupling as in the output Vo1. In this case, a relative feedback factor ratio between the respective outputs has to be decided, and when a large ratio is set for the output Vo1 corresponding to the printhead voltage, the stability of the output Vo1 is maintained. However, at a motor driving or stop timing, variations caused by overshooting or undershooting of the motor driving voltage Vo2 become larger than those in the case of the AC coupling. Conversely, a large feedback factor is set for the output Vo2, variations of the printhead voltage Vo1 increase, thus seriously deteriorating image quality.

FIG. 13 is a signal waveform chart showing voltage and current waveforms of the respective units in the 2-output voltage switching power supply shown in FIG. 12.

For example, at an activation timing (t=t1) of the conveyance motor M2, when a load current Io2 of the output Vo2 corresponding to the motor driving voltage is reduced by a peak current Ip1, the output Vo2 drops (undershoots) to Vp21 at that instance. A feedback current If2(ac) shown in FIG. 13 flows out from the node Vref1 toward the CR circuit 52, and the potential of the node Vref1 drops by that current flow-out amount.

As a result, the output voltage Vk of the shunt regulator IC 3 rises, and the ON duty of the PWM control by the control IC 1 increases to increase an energy generated by the transformer T9, thus effecting the feedback control that blocks the output voltage Vo2 from dropping. However, in the circuit shown in FIG. 12, even after the output current Io2 is stabilized to Ip2 at time t=t2, the output voltage Vo2 unwantedly drops by ΔVf compared to a level Vp20 before time t=t1, thus becoming a level Vp22.

This is because, as can be seen from the arrangement shown in FIG. 12, during a stable period of the output voltage Vo2, the feedback of that output does not function due to the AC coupling, and only the feedback of the output Vo1 is virtually effective. In other words, since the feedback of the output Vo2 is uncontrolled in terms of DC during a period T2, it exhibits a voltage drop tendency as its load current increases. For example, during a high-speed print medium conveyance period by the conveyance motor M2 shown in FIG. 11, the voltage drop ΔVf of the motor driving voltage Vo2 reaches about 3 to 4 V.

The description will be continued with reference to FIG. 13 again. At time t=t3, the driving operation of the conveyance motor M2 is stopped, and the current Io2 returns to zero. The output Vo2 instantaneously rises (overshoots) to Vp23 accordingly, and the feedback current If2(ac) reversely flows in from the CR circuit 52 to the node Vref1. As a result, the potential of the node Vref1 rises, the output voltage Vk of the shunt regulator IC 3 drops, and the ON duty of the PWM control by the control IC 1 decreases, thus reducing an energy generated by the transformer T9. In this manner, the feedback control that blocks the output voltage Vo2 from rising is effected.

Note that as shown in FIG. 13, the other output Vo1 is influenced by the large variations of the voltage Vo2 at times t=t1 and t3, and changes slightly in directions opposite to the voltage Vo2. That is, at instances of the large variations of the output Vo2, the output current Io1 of the output Vo1 exhibits only moderate changes, as shown in FIG. 13. For this reason, as described above, due to transfer of a large energy from the transformer by the feedback control caused by variations of the output Vo2, the output voltage Vo1 rises slightly at time t=t1, and reaches a Vp11 level, as shown in FIG. 13. Likewise, at time t=t3, the output Vo1 slightly drops to a Vp12 level conversely.

FIG. 14 is a block diagram showing the feedback control arrangement of the 2-output voltage switching power supply shown in FIG. 12. A difference from the 1-output voltage switching power supply described above with reference to FIG. 9 lies in that the transformer 83 has two outputs (83a and 83b), which are generated as the outputs Vo1 and Vo2 via rectifying and smoothing circuits 84a and 84b, respectively, as shown in FIG. 14. Also, respective feedback components from the outputs Vo1 and Vo2 are added by an adder 88 via weighting circuits 86, 87 which respectively weight feedback components by feedback factors α1 and α2, and the addition result is processed by the error amplifier 89 and is finally fed back to the PWM control unit 80. Thus, the driver 82 including the switching element (Q1) undergoes PWM control, thus controlling an energy to be generated by the transformer 83.

Especially, a change of the output voltage Vo1 is reflected to the feedback control via the feedback factor α1, and a change of the output voltage Vo2 is reflected to the feedback control via the feedback factor α2. As will be described later, these feedback factors α1 and α2 correspond to degrees of contribution of the corresponding outputs to the feedback control.

The description will be continued with reference to FIGS. 12 and 14. Since the feedback of the output voltage Vo1 is attained by the DC coupling, the constant feedback current If1(dc) always flows in from an output terminal Vo1 toward a reference terminal Vref1 of the shunt regulator IC 3. The current If1(dc) is given by:

$$If1(dc)=(Vo1-Vref)/R6 \quad (6)$$

where the reference voltage Vref is, for example, DC 2.5 V. On the other hand, since the feedback of the output voltage Vo2 is attained by the AC coupling, the feedback current If2(ac) which flows in from an output terminal Vo2 to the node Vref1 is cut-off to zero by the capacitor C52 during a stable period of the output voltage Vo2. Therefore, a total sum of currents which flow into a node Vref1 in a Vo2 stable period is given by:

$$If1(dc)+If2(ac) \approx If1(dc)(\because If2(ac) \approx 0) \quad (7)$$

Therefore, expression (8) is obtained from equation (6) and expression (7). That is, we have:

$$If1(dc)+If2(ac) \approx (Vo1-Vref)/R6 \quad (8)$$

Also, from expression (8), the feedback factors α1 and α2 are calculated, as given by:

$$\alpha1=1/R6, \alpha2=0 \quad (9)$$

This is because when the output voltages Vo1 and Vo2 are considered as variables in expression (8), their coefficients correspond to the feedback factors. However, in practice, the variable Vo2 does not appear in expression (8), and α2 becomes zero.

Next, from equations (9), feedback contributions ratios D(α1) and D(α2) of α1 and α2 are calculated, as given by:

$$D(\alpha1) = \alpha1/(\alpha1+\alpha2) \quad (10)$$
$$= 1.0$$

$$D(\alpha2) = 0 \quad (11)$$

As can be seen from the above description, only the output Vo1 contributes to the feedback during a stable period of the output voltage Vo2 (the period T2 in FIG. 13).

On the other hand, as shown in FIG. 12, the current Iref1 which flows out from the node Vref1 is given by:

$$Iref1=Vref/R7 \quad (12)$$

Since the current which flows into the node Vref1 and that which flows out from that node are controlled to be equal to each other by the operation of the error amplifier 14 including the shunt regulator IC 3, equation (13) holds. That is, we have:

$$If1(dc)+If2(ac)=Vref/R7 \quad (13)$$

In this case, expression (14) is obtained from expression (7). That is, we have:

$$If1(dc) \approx Vref/R7 \quad (14)$$

On the other hand, when the motor driving voltage instantaneously varies like in a period T1 in FIG. 13 (for example, at activation timings of the conveyance motor M2 and carriage motor M1), the output Vo2 is reduced by a voltage which contributes to supplying a large current. For this reason, if the feedback of the output Vo2 is not taken into consideration, the output voltage Vo2 causes a large voltage drop at that instance, and the servo-control of motors may become abnormal. For this reason, since the circuit shown in FIG. 12 adopts the feedback by means of the AC coupling of the output Vo2, the following feedback correction is executed against such instantaneous variations of the output Vo2. That is, letting ΔVp be a voltage variation of the output Vo2, the feedback current If2(ac) from the output Vo2 flows out from the node Vref1 to the CR circuit 52 (see FIG. 12)

$$If2(ac)=-\Delta Vp/R51*exp(-T/CR) \quad (15)$$

In this case, the minus sign in equation (15) means flowing-out of the current from the node Vref1. Also, C of the CR time constant in equation (15) is a value of the capacitor C52, R is that of the resistor R51, and a variable T corresponds to an elapsed time since the motor activation timing, that is, an elapsed time from time t=t1 in FIG. 13. Furthermore, the period T1 of Vref1 shown in FIG. 13 reveals a potential drop state of the node Vref1 by a flow-out amount of the current If2(ac). In FIG. 13, Ifp21 shows a minimum value of the current If2(ac) during a time interval T1, and Ifp 22 shows a maximum value of the current If2 (ac) during a time interval T3. Also, in FIG. 13, a time interval T1 from times t=t1 to t2 is associated with the CR time constant in equation (15).

As described above, during the period T1 in FIG. 13, from equations (6) and (15), a total sum of feedback currents is calculated, as given by:

$$If1(dc)+If2(ac)=(Vo1-Vref)/R6-\Delta Vp/R51*exp(-T/CR) \quad (16)$$

From equation (16), respective coefficients of the variables Vo1 and ΔVp, that is, feedback factors are respectively calculated, as given by:

$$\alpha1=1/R6 \quad (17)$$

$$\alpha2=-1/R51*exp(-t/CR) \quad (18)$$

In equation (18), the minus sign of α2 indicates a drop of the output voltage Vo2, and conversely, a plus sign indicates a rise of the output voltage Vo2. Also, as can be seen from equation (18), the feedback factor at time t=0 is larger as the resistor R51 in FIG. 12 decreases.

That is, the current which flows out from the node Vref1 increases with decreasing resistor R51, and a change of the output voltage Vo2 is consequently reflected to the node Vref1 at a high sensitivity, thus transferring the change to the subsequent error amplifier 14. However, when the value of the resistor R51 is set to be too small, the influence of the feedback factor α2 becomes too large, thus causing excessive overshooting or undershooting at a return timing from variations of the output voltage Vo2, and adversely influencing the other output Vo1.

Also, as can be seen from equation (18), the feedback factor of the output Vo2 includes an exponential function. For this reason, for example, when there are a plurality of motors (carriage motor M1, conveyance motor M2, scanner motor M3, and the like) of different activation currents, it is difficult to optimally control all the motors using one type of the CR time constant.

As described above, in the conventional 2-output voltage switching power supply shown in FIG. 12, an optimal feedback factor cannot be selected at the time of instantaneous variations of the motor driving voltage caused at activation timings of the plurality of motors having different activation currents. Furthermore, the feedback factor α2 of the motor driving voltage becomes zero in effect after the motors reach nearly a stabilized condition, thus consequently causing a drop of that output voltage. As a result, in the conventional circuit shown in FIG. 12, the printhead driving voltage can be precisely maintained, while the motor driving voltage unwantedly drops in a high-speed print medium conveyance period or the like. Hence, it is difficult to attain a high-speed throughput.

SUMMARY OF THE INVENTION

Accordingly, the present invention is conceived as a response to the above-described disadvantages of the conventional art.

For example, a power supply apparatus and a printing apparatus according to this invention are capable of precisely controlling a printhead driving voltage, while attaining required stability of a motor driving voltage according to a print operation sequence.

According to one aspect of the present invention, there is provided a power supply apparatus comprising: a transformer having a primary winding, a first secondary winding, and a second secondary winding; a first DC voltage generation unit configured to generate a first DC voltage from a voltage generated by the first secondary winding; a second DC voltage generation unit configured to generate a second DC voltage from a voltage obtained by superimposing a voltage generated by the second secondary winding on the first DC voltage; a switching unit configured to energize the primary winding; and a control unit, including a voltage input node, configured to control the switching unit so that a voltage input to the voltage input node becomes constant, the voltage input node being connected to an output node of the first DC voltage generation unit, an output node of the second DC voltage generation unit, and ground via resistors, respectively.

According to another aspect of the present invention, there is provided a printing apparatus comprising: the above-mentioned power supply apparatus; a printhead supplied with the first DC voltage; a motor supplied with the second DC voltage; and a control unit configured to control the printhead and the motor.

According to still another aspect of the present invention, there is provided a printing apparatus including a printhead and a motor, wherein the apparatus comprises a switching power supply configured to generate a first output voltage required to drive the printhead and a second output voltage, higher than the first output voltage, required to drive the motor, and the switching power supply comprises: a transformer configured to generate the first output voltage by a first secondary winding and to generate a superimposing voltage to be superimposed on the first output voltage by a second secondary winding; a driver configured to drive the transformer; a first rectifying and smoothing circuit configured to rectify and smooth the first output voltage; a second rectifying and smoothing circuit configured to rectify and smooth the superimposing voltage; an adder configured to add the superimposing voltage rectified and smoothed by the second rectifying and smoothing circuit to the first output voltage rectified and smoothed by the first rectifying and smoothing circuit to output the second output voltage; and a feedback control unit configured to feed back the first output voltage and the second output voltage respectively by DC coupling, to adjust the fed-back first output voltage and the fed-back second output voltage by a first feedback factor and a second feedback factor, respectively, to combine and amplify respective adjusted feedback components, and to apply PWM control to the driver by the combined and amplified feedback components.

The invention is particularly advantageous since feedback factors corresponding to two output voltages generated from a single transformer are allowed to be changed as needed between the two output voltages. Thus, according to a print operation sequence, the feedback factors of the respective output voltages can be quantitatively controlled. As a result, a high-quality image can be printed, and the throughput can be improved by speeding up conveyance of a print medium.

Further features of the present invention will become apparent from the following description of exemplary embodiments (with reference to the attached drawings).

DESCRIPTION OF THE EMBODIMENT

An Exemplary embodiment of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Moreover, the term "printing element" (also referred to as "nozzle") generically represents an ink orifice, an ink channel which communicates with this orifice, and an element required to generate an energy used to discharge an ink unless otherwise specified.

<Outline of Printing Apparatus (FIGS. 1 and 2)>

Figure 1:
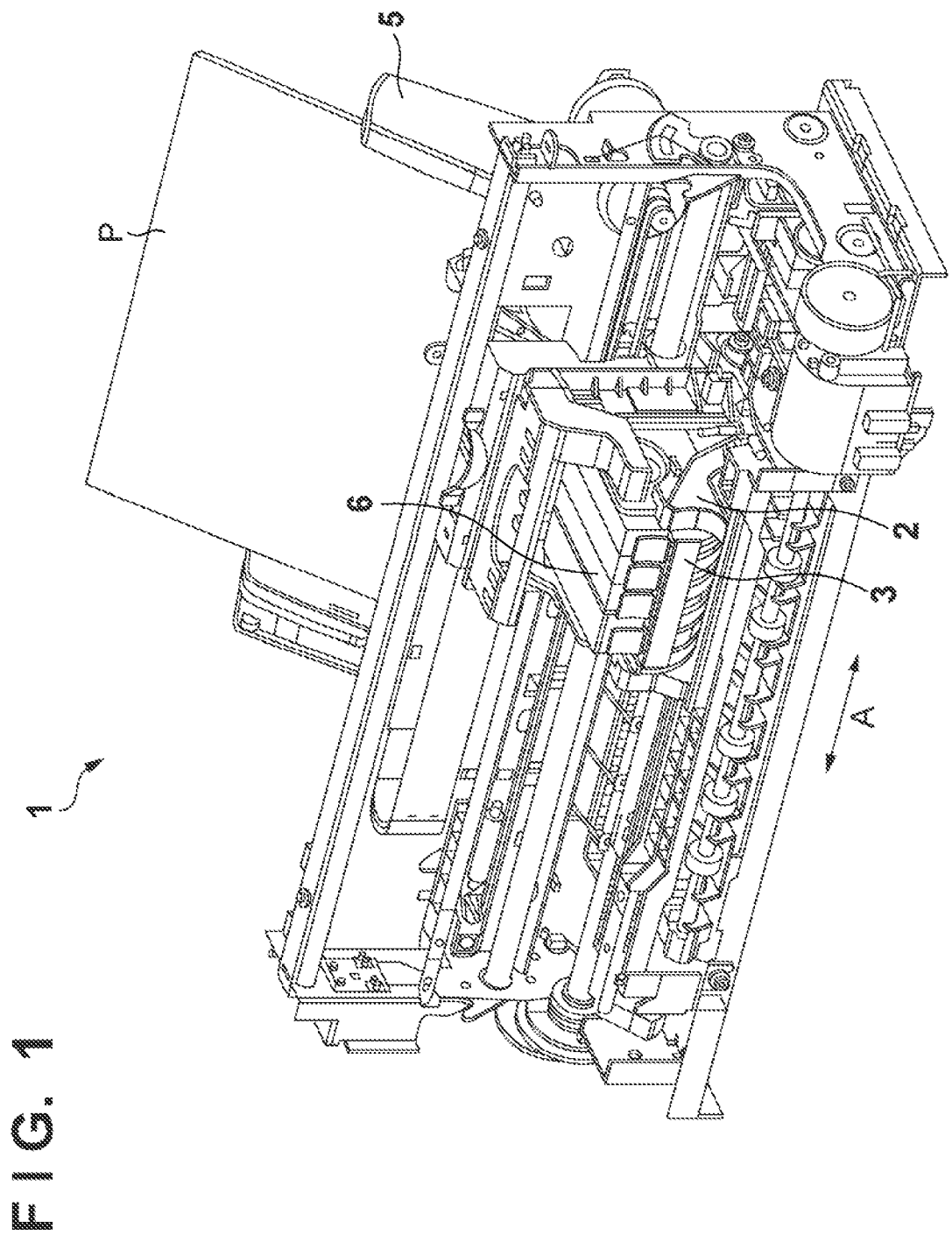
FIG. 1 is a perspective view showing an outline of the arrangement of an inkjet printing apparatus as an exemplary embodiment of the present invention.

FIG. 1 is a perspective view showing an outline of the arrangement of a printing apparatus which performs a printing operation using an inkjet printhead (to be referred to as a printhead hereinafter) as an exemplary embodiment of the present invention.

As shown in FIG. 1, an inkjet printing apparatus (to be referred to as a printing apparatus hereinafter) 1 mounts an inkjet printhead (to be referred to as a printhead hereinafter) 3, which performs a printing operation by discharging an ink according to an inkjet printing method, on a carriage 2, and reciprocally scans the carriage 2 in directions of a double-headed arrow A, thus performing the printing operation. The apparatus 1 feeds a printing or print medium P such as a printing paper sheet via a paper feed mechanism 5, conveys the fed printing medium P to a printing position, and discharges an ink onto the printing medium P from the printhead 3, thereby attaining the printing operation.

On the carriage 2 of the printing apparatus 1, not only the printhead 3 but also ink tanks 6 which store inks to be supplied to the printhead 3 are mounted. The ink tanks 6 are detachable from the carriage 2.

The printing apparatus 1 shown in FIG. 1 is capable of color printing, and four ink cartridges which respectively store magenta (M), cyan (C), yellow (Y), and black (K) inks are mounted on the carriage 2 for this purpose. These four ink cartridges are independently detachable.

The printhead 3 of this embodiment adopts an inkjet printing method which discharges an ink using a heat energy. For this purpose, the printhead 3 includes electrothermal transducers. The electrothermal transducers are arranged in correspondence with orifices, and inks are discharged from the corresponding orifices by applying pulse voltages to the corresponding electrothermal transducers in accordance with a print signal. Note that the printing apparatus is not limited to the aforementioned serial type printing apparatus, but the present invention is also applicable to a so-called full-line type printing apparatus, in which a printhead (line head) on which orifices are disposed in a widthwise direction of a printing medium is arranged in a conveyance direction of the printing medium.

Figure 2:
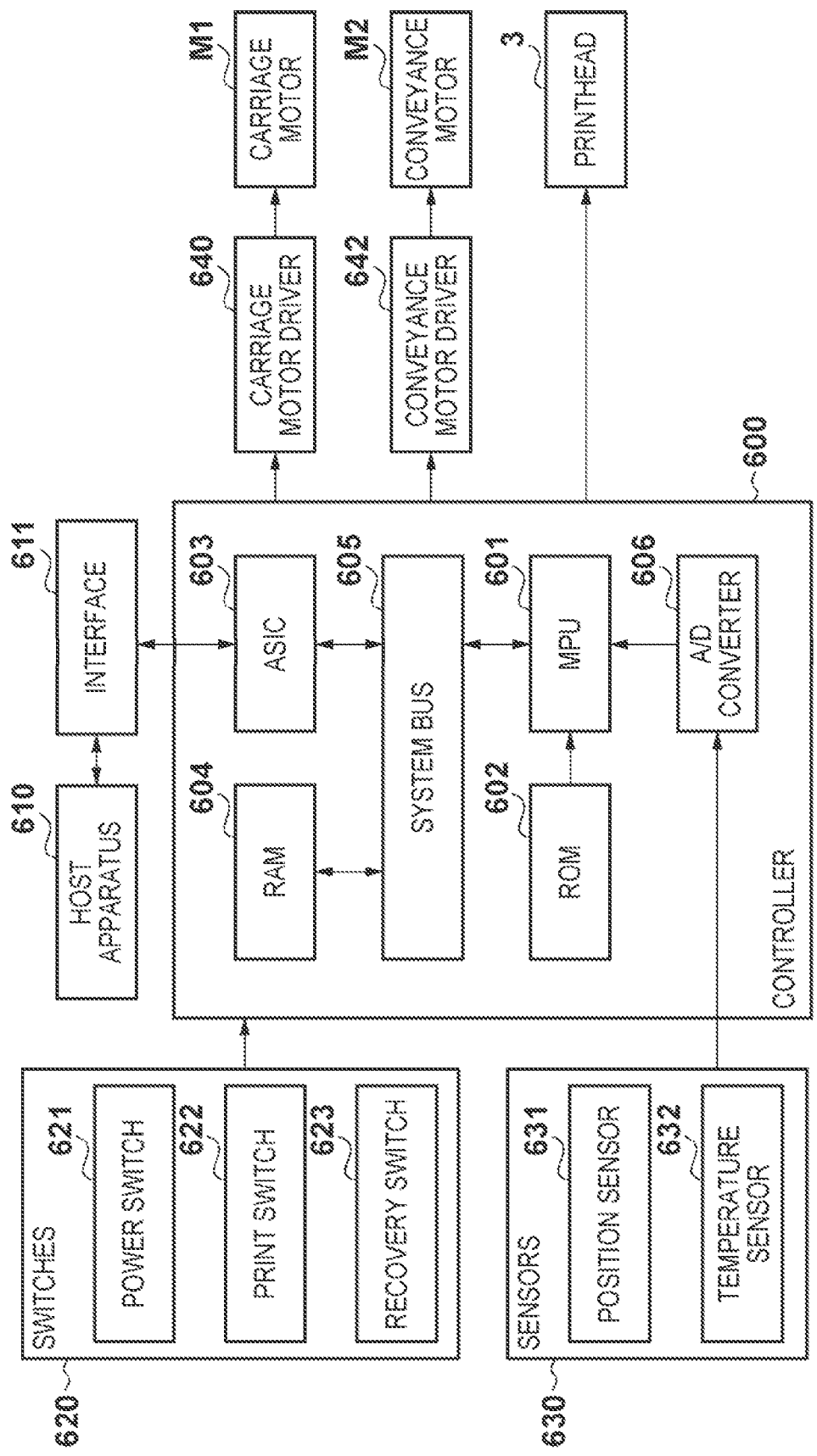
FIG. 2 is a block diagram showing the control arrangement of the inkjet printing apparatus shown in FIG. 1.

FIG. 2 is a block diagram showing the control arrangement of the printing apparatus shown in FIG. 1.

As shown in FIG. 2, a controller 600 includes an MPU 601, ROM 602, ASIC (Application Specific Integrated Circuit) 603, RAM 604, system bus 605, A/D converter 606, and the like. The ROM 602 stores a program corresponding to a control sequence (to be described later), required tables, and other permanent data. The ASIC 603 generates control signals for control of a carriage motor M1, that of a conveyance motor M2, and that of the printhead 3. The RAM 604 is used as an expansion area of image data, a work area required to execute a program, and the like. The system bus 605 connects the MPU 601, ASIC 603, and RAM 604 to each other so as to exchange data. The A/D converter 606 receives analog signals from sensors (to be described later), A/D-converts these signals, and supplies digital signals to the MPU 601.

Referring to FIG. 2, reference numeral 610 denotes a host apparatus which serves as an image data supply source, and corresponds to a host such as a personal computer, a digital camera, a scanner, a memory stick or the like. The host apparatus 610 and printing apparatus 1 exchange image data, commands, statuses, and the like using packet communications via an interface (I/F) 611. Note that a USB interface may be further included independently of a network interface as the interface 611 so as to allow to receive bit data and raster data serially transferred from the host.

Furthermore, reference numeral 620 denotes switches, which include a power switch 621, print switch 622, recovery switch 623, and the like.

Reference numeral 630 denotes sensors, which are used to detect apparatus states, and include a position sensor 631, temperature sensor 632, and the like. In this embodiment, photosensors which detect ink remaining amounts are arranged in addition to the above sensors.

Reference numeral 640 denotes a carriage motor driver required to drive the carriage motor M1 used to reciprocally scan the carriage 2 in the directions of the double-headed arrow A; and 642, a conveyance motor driver required to drive the conveyance motor M2 used to convey the printing medium P.

The ASIC 603 transfers data required to drive printing elements (discharge heaters) to the printhead while directly accessing a storage area of the RAM 604 upon execution of print scans by the printhead 3. In addition, this printing apparatus includes a display unit configured by an LCD and LEDs as a user interface.

A switching power supply which supplies electric power to the respective units of the printing apparatus with the above arrangement will be described below.

Figure 3:
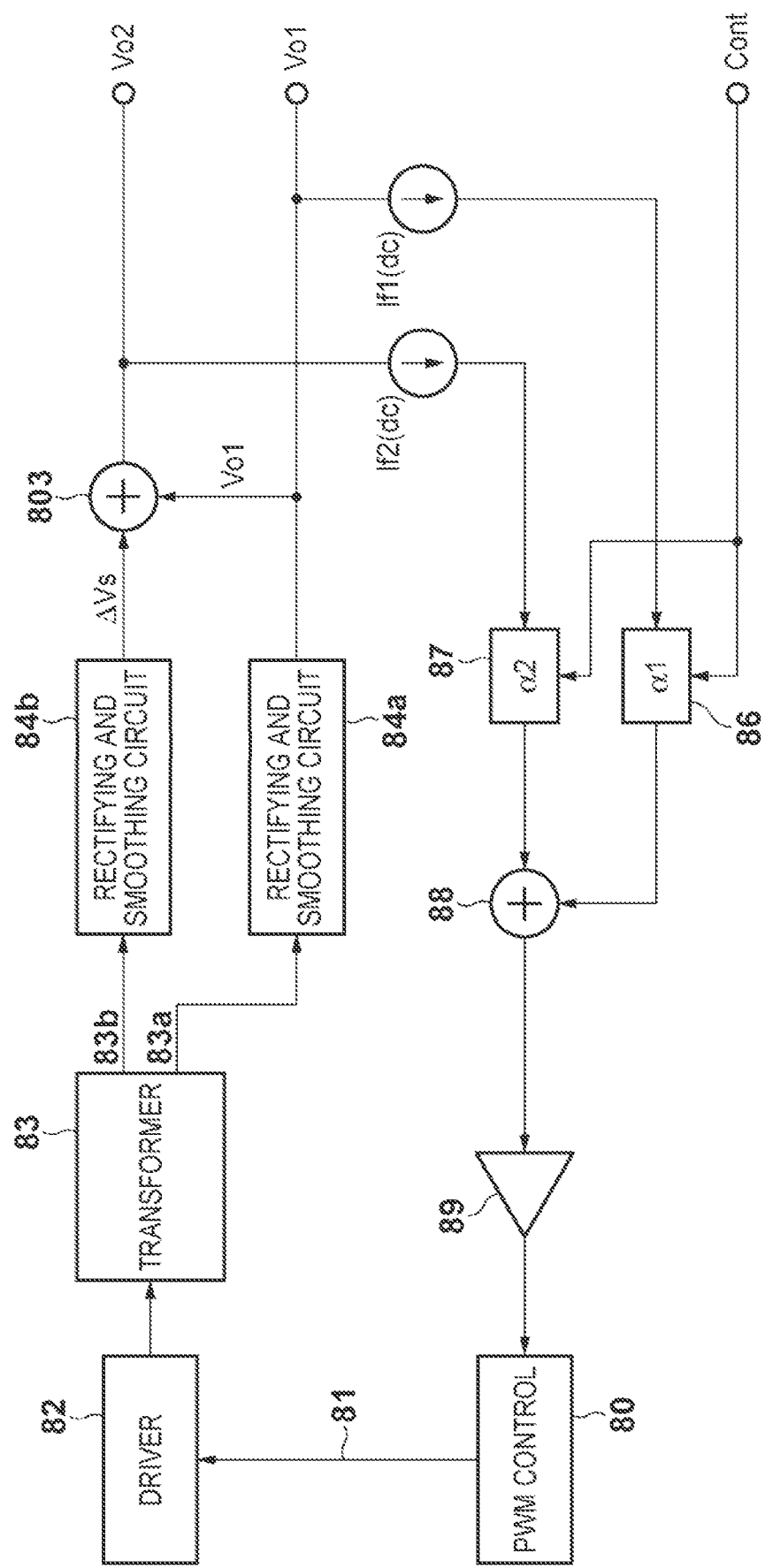
FIG. 3 is a conceptual diagram of feedback control of a switching power supply according to the present invention.

FIG. 3 is a block diagram showing the feedback control arrangement of a switching power supply which includes two output voltages (to generate two different voltages). Note that the same reference numerals and symbols in FIG. 3 denote the same elements and signals described in the aforementioned conventional feedback control arrangement shown in FIG. 14, and a description thereof will not be repeated. In this connection, a rectifying and smoothing circuit 84a will be referred to as a first rectifying and smoothing circuit hereinafter, and a rectifying and smoothing circuit 84b will be referred to as a second rectifying and smoothing circuit hereinafter.

Figure 14:
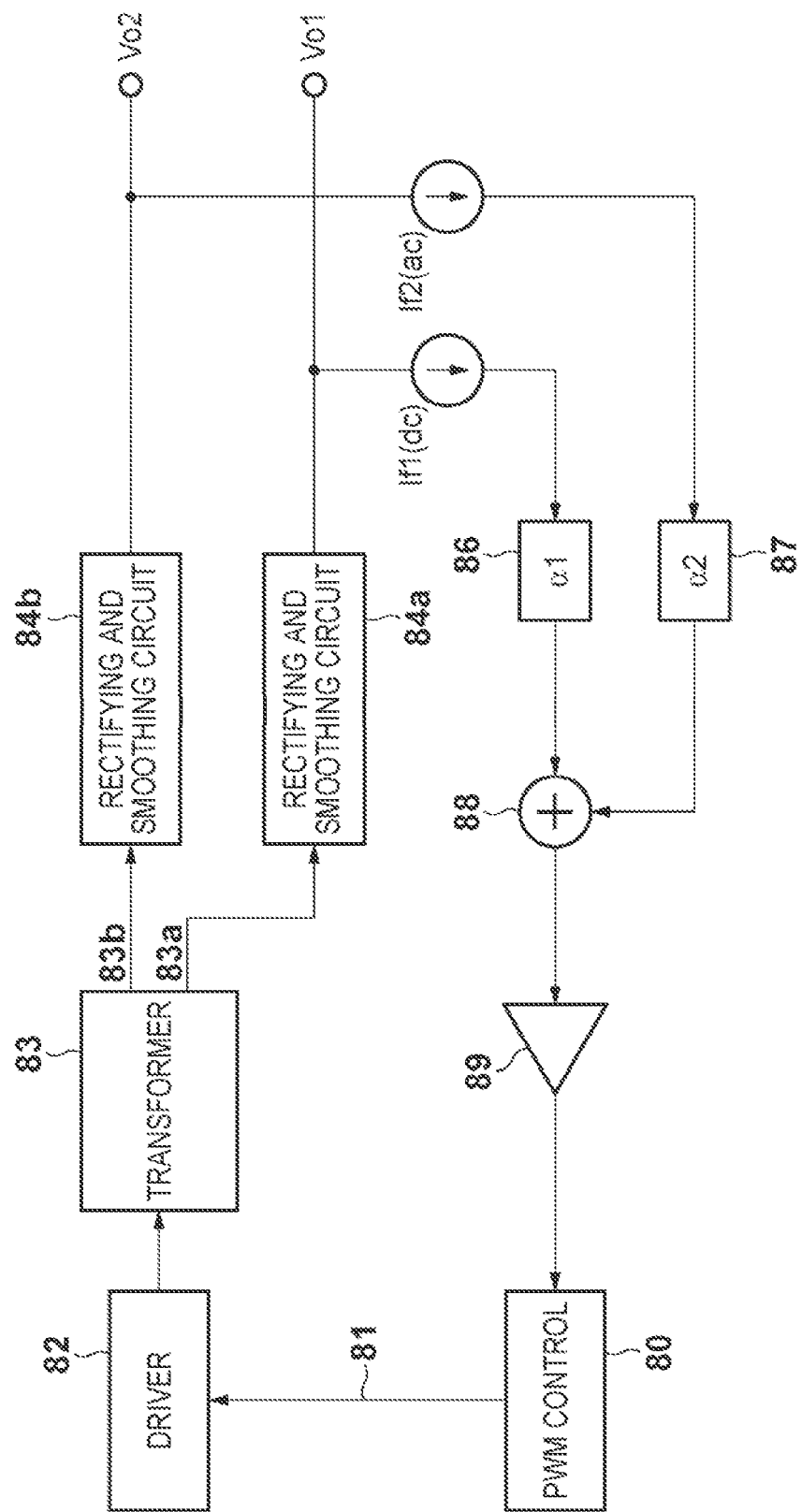
FIG. 14 is a block diagram showing an outline of feedback control of the switching power supply shown in FIG. 12.
Figure 15A:
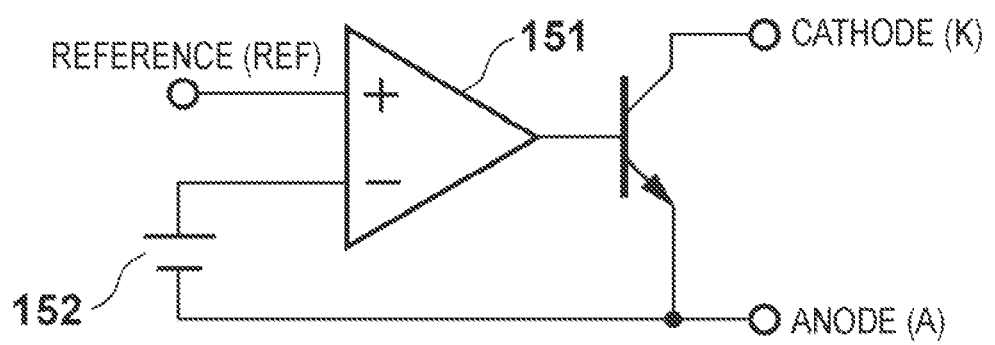
FIGS. 15A and 15B are explanatory circuit diagrams for a shunt regulator.
Figure 15B:
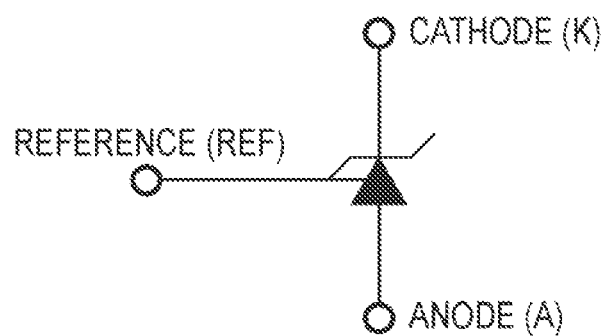

Major differences from the conventional arrangement shown in FIG. 14 include the following three points:

(1) a motor driving voltage Vo2 is generated by superimposing a voltage on a printhead driving voltage Vo1 with reference to the printhead driving voltage Vo1;

(2) both the output voltages Vo1 and Vo2 are fed back by DC coupling; and (3) feedback factors α1 and α2 of the output voltages Vo1 and Vo2 are relatively variably controllable.

With this arrangement, a second output voltage Vo2 is generated, as given by:

$$Vo2 = Vo1 + \Delta Vs \quad (19)$$

where Vo1 is a first output voltage, ΔVs is a voltage to be superimposed on the output Vo1, and Vo2 is the second output voltage. As can be seen from FIG. 3, an adder 803 adds the superimposing voltage ΔVs to the first output voltage Vo1, thereby generating the second output voltage Vo2.

Therefore, when the output Vo1 is stably controlled, variations of the output Vo2 depend only on the superimposing voltage ΔVs. In other words, since the stability of the output voltage Vo2 depends on that of the output voltage Vo1, when the Vo1 stability is satisfactorily maintained and the superimposing voltage ΔVs is stably maintained, that is, when constant feedback is made to the superimposing voltage ΔVs, the output voltage Vo2 can also be stably controlled.

Figure 8:
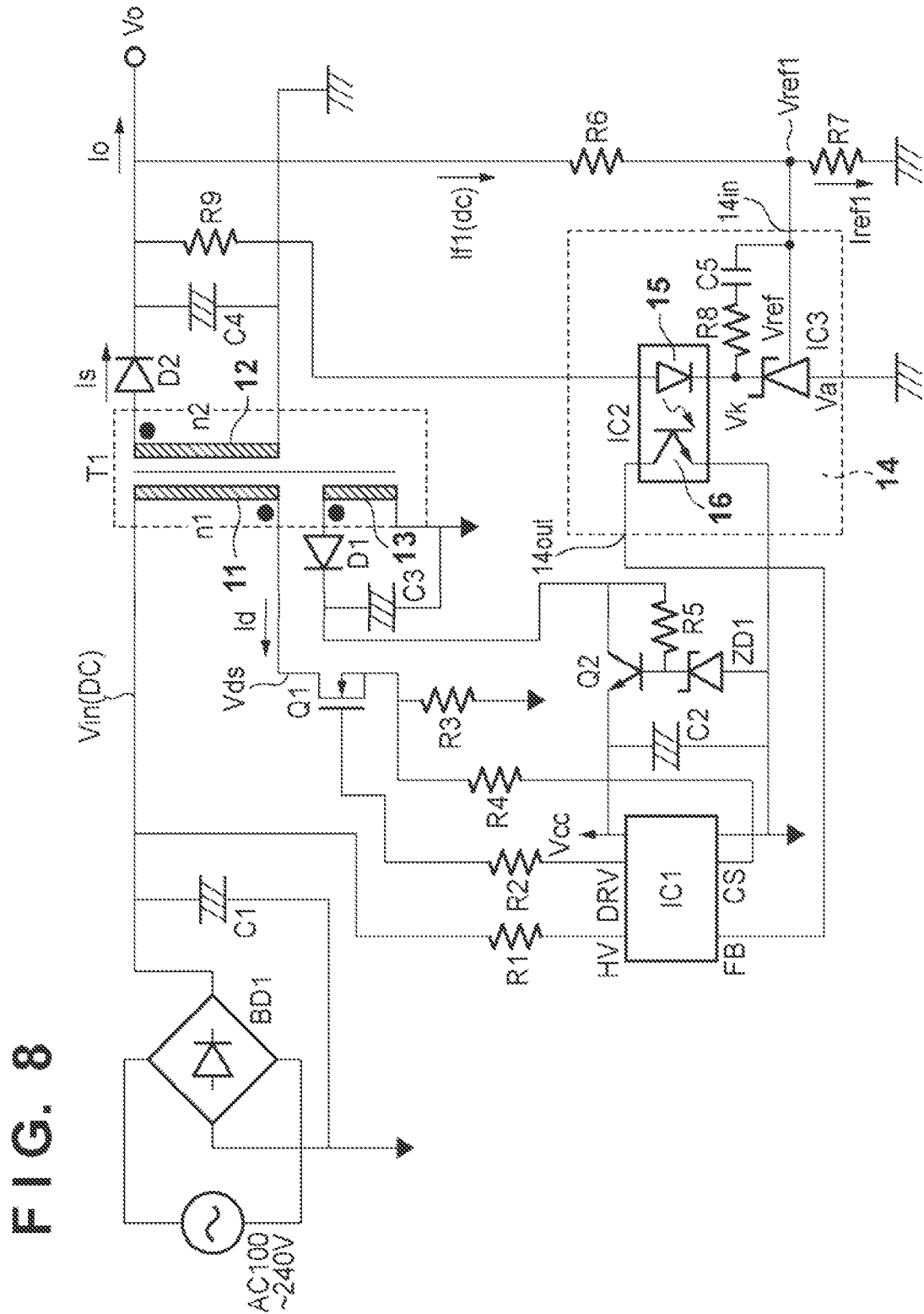
FIG. 8 is a circuit diagram showing an example of a switching power supply using a conventional flyback method.
Figure 9:
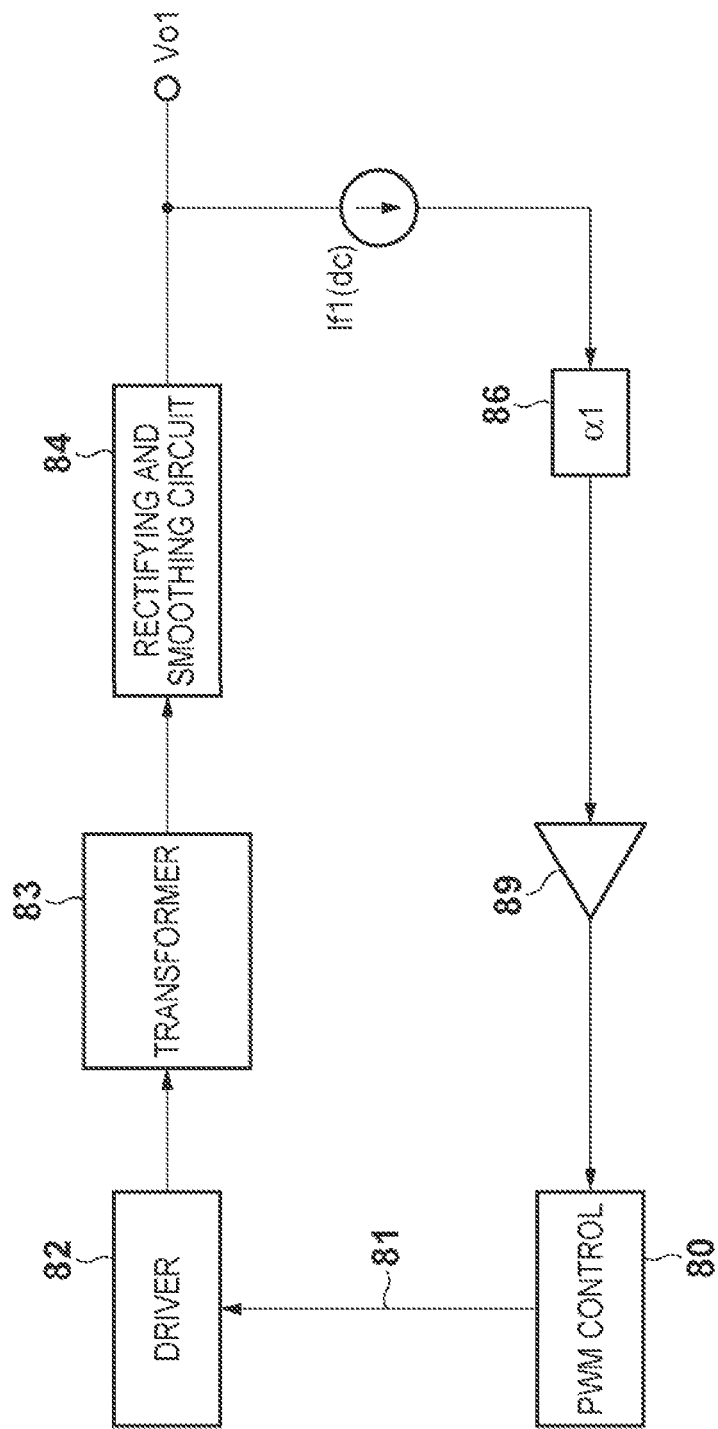
FIG. 9 is a block diagram showing an outline of feedback control of the switching power supply shown in FIG. 8.
Figure 10:
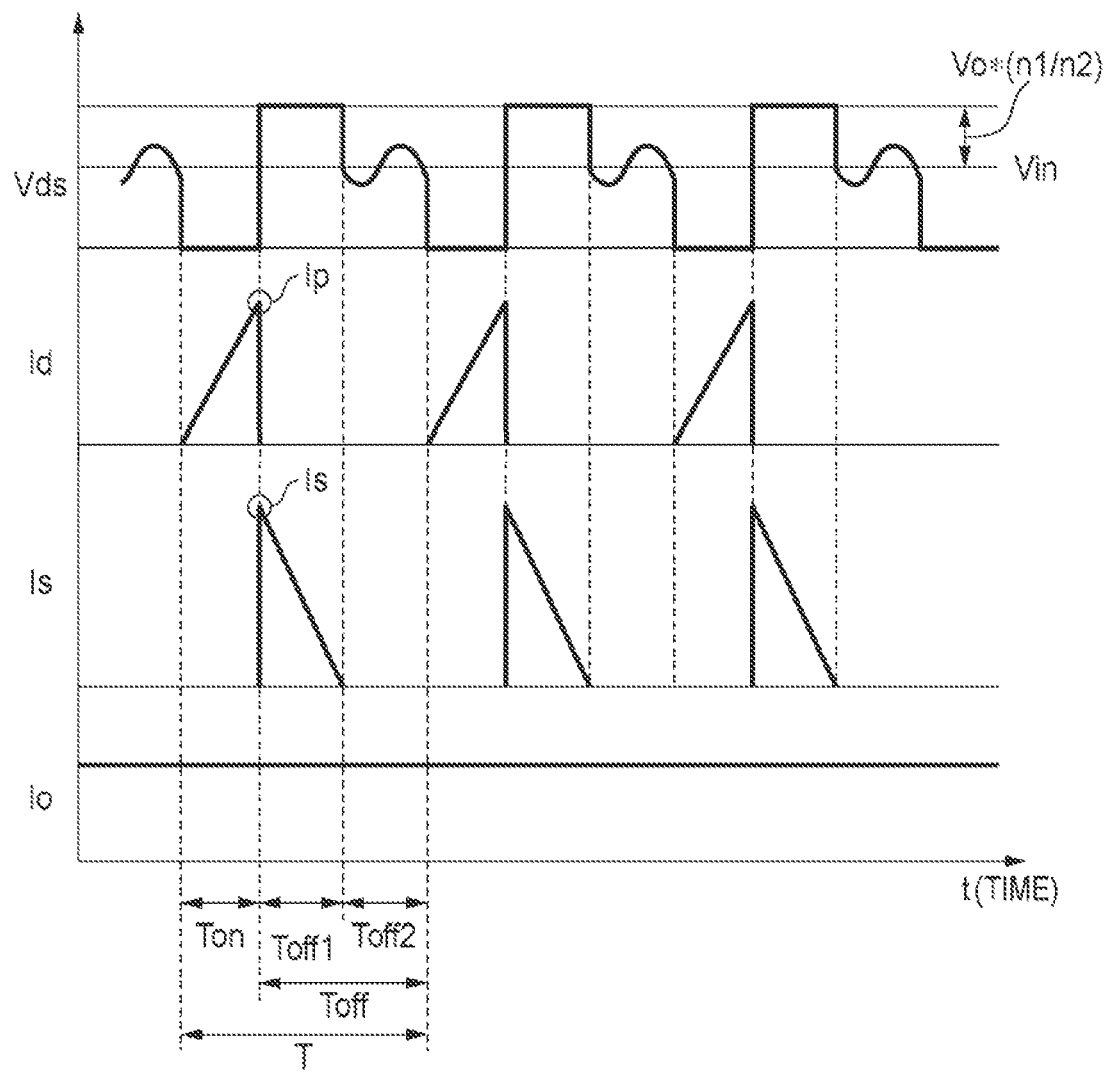
FIG. 10 is a signal waveform chart showing voltage and current waveforms of respective units in the switching power supply shown in FIG. 8.
Figure 11:
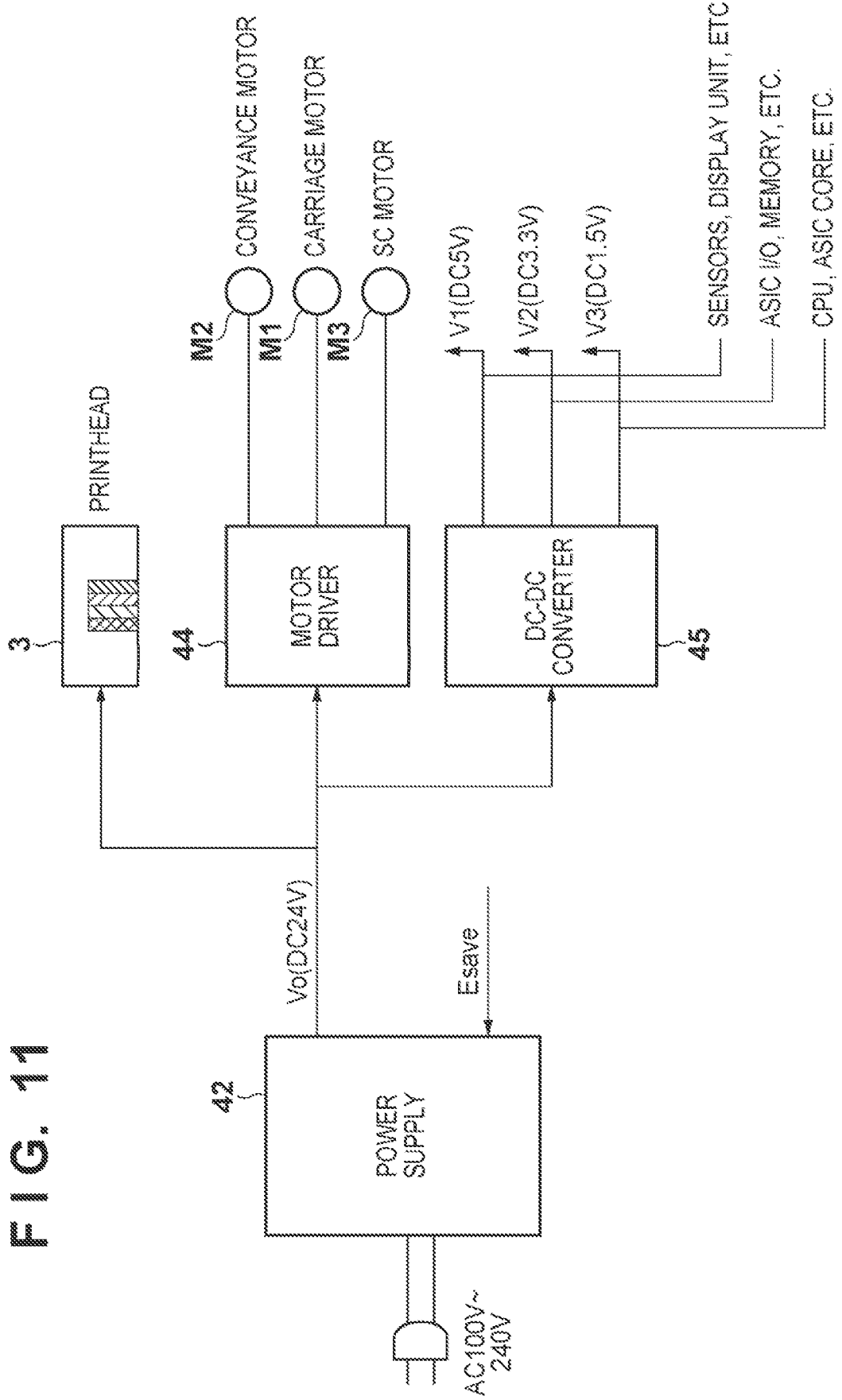
FIG. 11 is a block diagram showing the arrangement of a power supply unit of an inkjet printing apparatus.

Note that in FIG. 3, a feedback factor of the output Vo1 is α1, and that of the output Vo2 is α2. In this case, α1 will be referred to as a first feedback factor hereinafter, and α2 will be referred to as a second feedback factor hereinafter. With these factors, feedback contribution ratios of the output voltages Vo1 and Vo2 are adjusted. An adder 88 adds respective feedback components, and that result is input to and amplified by an error amplifier 89. Finally, a PWM control unit 80 PWM-controls a driver 82 including a switching element (Q1), thereby controlling an energy to be generated by a transformer 83. As a result, feedback control of the respective outputs according to the feedback factors are implemented. That is, in the arrangement shown in FIG. 3, to put differently, the driver 82 is a switching unit required to energize a primary winding of the transformer. The PWM control unit 80 and error amplifier 89 configure a control unit which controls the switching unit. Note that the outline of the PWM control is as has been described above with reference to FIGS. 8 to 10.

Furthermore, in the arrangement shown in FIG. 3, the feedback factors α1 and α2 are optionally controlled based on a control signal (Cont) according to a print operation sequence of the printing apparatus. More specifically, as will be described later, the respective feedback factors are selected to preferentially control the printhead driving voltage Vo1 during a printing period, but they are selected to suppress variations of the motor driving voltage Vo2 upon conveyance of a printing medium.

Figure 4:
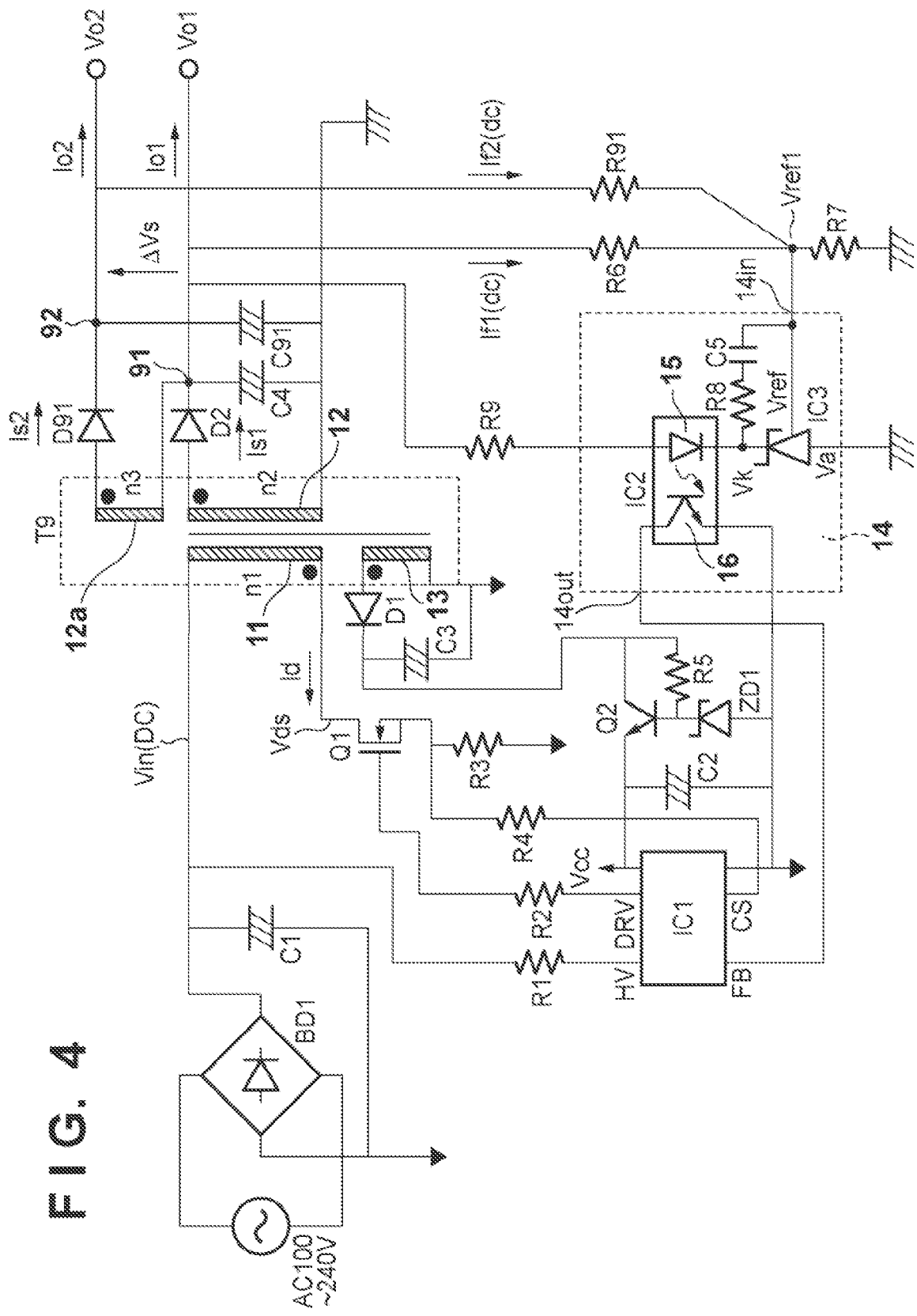
FIG. 4 is a circuit diagram showing the switching power supply according to the first embodiment of the present invention.

FIG. 4 is a circuit diagram showing the arrangement of a 2-voltage output switching power supply which implements the feedback control shown in FIG. 3. Note that a circuit including a diode D2 and capacitor C4 is a first DC voltage generation circuit in another expression. A circuit including a diode D91 and capacitor C91 is a second DC voltage generation circuit in another expression. A correspondence relationship between the arrangement shown in FIG. 3 and that shown in FIG. 4 will be supplemented. A switching element Q1 in FIG. 4 is included in the driver 82 shown in FIG. 3. A control IC 1 shown in FIG. 4 is included in the PWM control unit 80 shown in FIG. 3. A control circuit 14 shown in FIG. 4 is included in the error amplifier 89.

Figure 12:
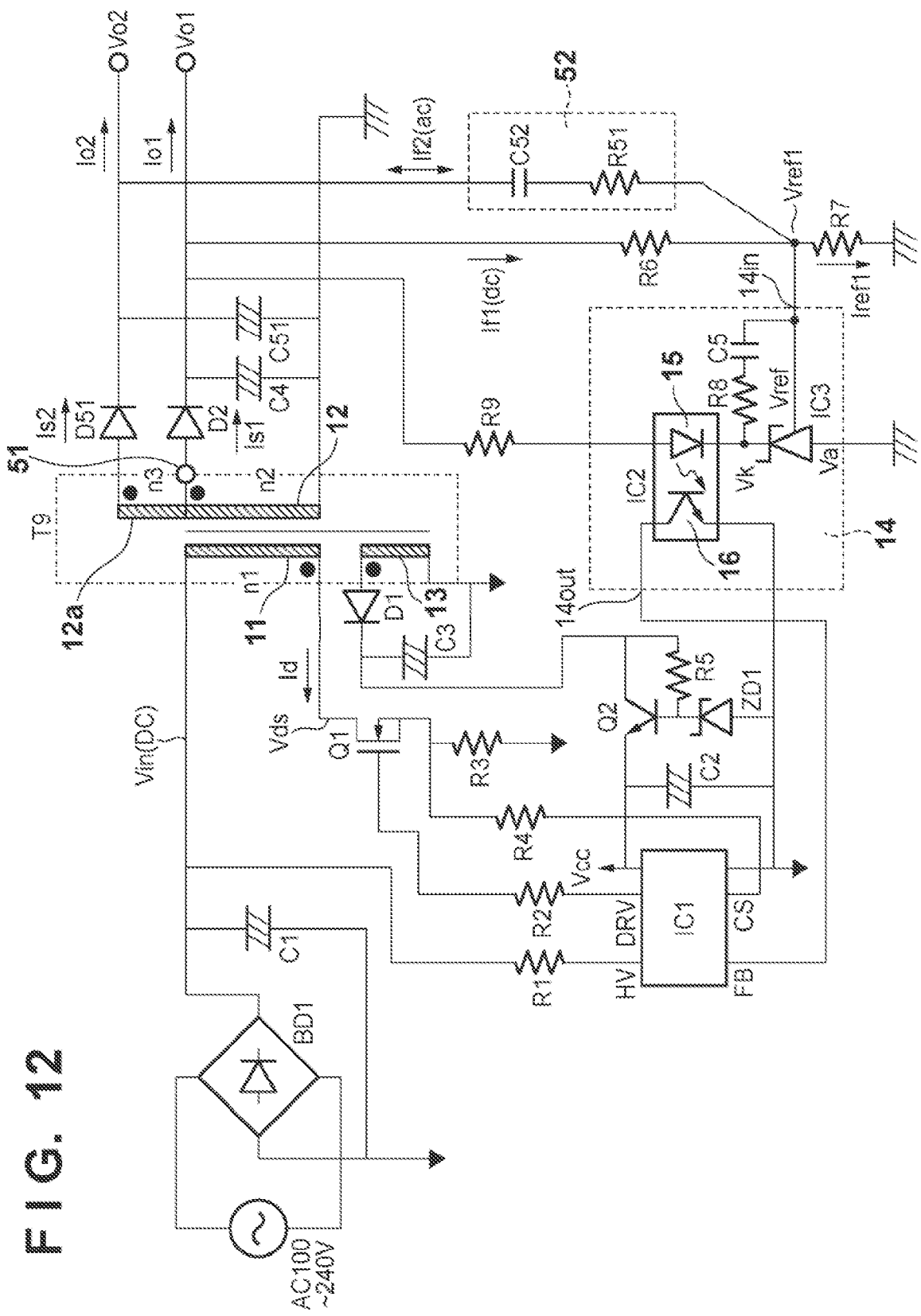
FIG. 12 is a circuit diagram showing an example of a conventional switching power supply which generates two output voltages.

Note that the same reference numerals and symbols in FIG. 4 denote the same elements and signals as those described in the aforementioned conventional switching power supply shown in FIG. 12, and a description thereof will not be repeated. As can be seen from comparison between FIGS. 4 and 12, differences from the conventional circuit shown in FIG. 12 lie in the following points. That is, first and second windings (n2: the number of windings) and 12a (n3: the number of windings) of a transformer T9 are independently arranged without any intermediate tap, an output winding 12a is circuit-connected to have, as an origin, a node 91 after the output Vo1 is rectified and smoothed, and the output Vo2 is generated via the diode D91 and C91 of the rectifying and smoothing circuit.

With this arrangement, since the output voltage Vo2 is generated while being superimposed on the stabled output voltage (first DC voltage) Vo1, the output voltage (second DC voltage) Vo2 can consequently benefit from the stabilization of the output voltage Vo1. As a result, the more stable output Vo2 can be obtained compared to the circuit shown in FIG. 12. Furthermore, in this embodiment, since both the outputs Vo1 and Vo2 undergo feedback control by the DC coupling, the output Vo2 can be quantitatively stabilized compared to the conventional circuit shown in FIG. 12.

As still another merit, a tolerable voltage of the rectifier diode D91 is relaxed compared to that required for the diode D51 shown in FIG. 12 since a peak reverse voltage VRm required for a rectifier diode becomes smaller.

That is, in the conventional circuit shown in FIG. 12, the peak reverse voltage VRm is given by:

$$VRm = Vin(\text{dc}) * (n2+n3)/n1 + Vo2 + Vr \quad (20)$$

By contrast, in this embodiment, the peak reverse voltage Vrm is given by:

$$VRm = Vin(\text{dc}) * n3/n1 + Vo2 + Vr \quad (21)$$

Upon comparison between these two equations, when terms depending on transformer turn ratios, that is, the first terms of equations (20) and (21) are compared, a multiplier of a primary smoothed DC voltage Vin(dc) is (n2+n3)/n1 in equation (20), while it is n3/n1 in equation (21). That is, the latter case assumes a smaller value, and the peak reverse voltage VRm is consequently reduced. Note that in equations (20) and (21), the primary smoothed DC voltage Vin(dc) is a DC voltage as a result of rectifying and smoothing an input voltage of AC 100 V to AC 240 V, and Vr is a surge voltage caused by a leakage inductance related to the secondary windings 12 (n2: the number of windings) and 12a (n3: the number of windings) of the transformer T9. In this case, the winding 12 will be referred to as a first secondary winding hereinafter, and the winding 12a will be referred to as a second secondary winding hereinafter.

For example, when Vo1=DC 24 V and Vo2=DC 32 V, the peak reverse voltage VRm of the diode D51 in the conventional circuit shown in FIG. 12 requires 200 V to 250 V, but the voltage VRm of the diode D91 in the circuit of this embodiment shown in FIG. 4 suffices to be about 60 V.

The description will be continued with reference to FIG. 4 again. The control circuit 14 has an input node 14 in and output node 14out. The input node 14 in is connected to one terminal of each of resistors R6, R91, and R7. The other terminal of the resistor R6 is connected to a node 91. The other terminal of the resistor R91 is connected to a node 92. The other terminal of the resistor R7 is connected to ground. Note that the input node 14 in is connected to a REF terminal of a shunt regulator IC 3. The output node 14out is connected to an FB terminal of an IC 1.

A feedback of the output voltage Vo1 is attained by DC coupling via the resistor R6, and that of the output voltage Vo2 is similarly attained by DC coupling via the resistor R91. As described above, in the conventional circuit shown in FIG. 12, the feedback of the output voltage Vo2 is attained by AC coupling. If this feedback is attained by DC coupling, voltage variations of the output Vo1 which requires high precision become large, thus posing a problem.

The reason why voltage variations of the output Vo2 are suppressed in the circuit of this embodiment shown in FIG. 4 will be described in detail below.

As shown in FIG. 4, the output Vo2 is generated by superimposing a voltage increment ΔVs generated by the winding 12a on the output Vo1 with reference to the output Vo1. Therefore, as described above with reference to FIG. 3, the output voltage Vo2 is given by:

$$Vo2 = Vo1 + \Delta Vs \qquad (22)$$

Also, in the circuit shown in FIG. 4, both feedback currents If1(dc) and If2(dc) corresponding to the feedback factors are generated by the DC coupling, and are respectively given by:

$$If1(dc) = (Vo1 - Vref)/R6 \qquad (23)$$

$$If2(dc) = (Vo2 - Vref)/R91 \qquad (24)$$

Therefore, from equations (22) to (24), a combined current at a node Vref1 is calculated, as given by:

$$\begin{aligned}
If1(dc) + If2(dc) &= (Vo1 - Vref)/R6 + (Vo2 - Vref)/R91 \qquad (25) \\
&= (Vo1 - Vref)/R6 + \\
&\quad (Vo1 + \Delta Vs - Vref)/R91 \\
&= (1/R6 + 1/R91) * Vo1 + \Delta Vs/R91 - \\
&\quad (1/R6 + 1/R91) * Vref
\end{aligned}$$

Figure 13:
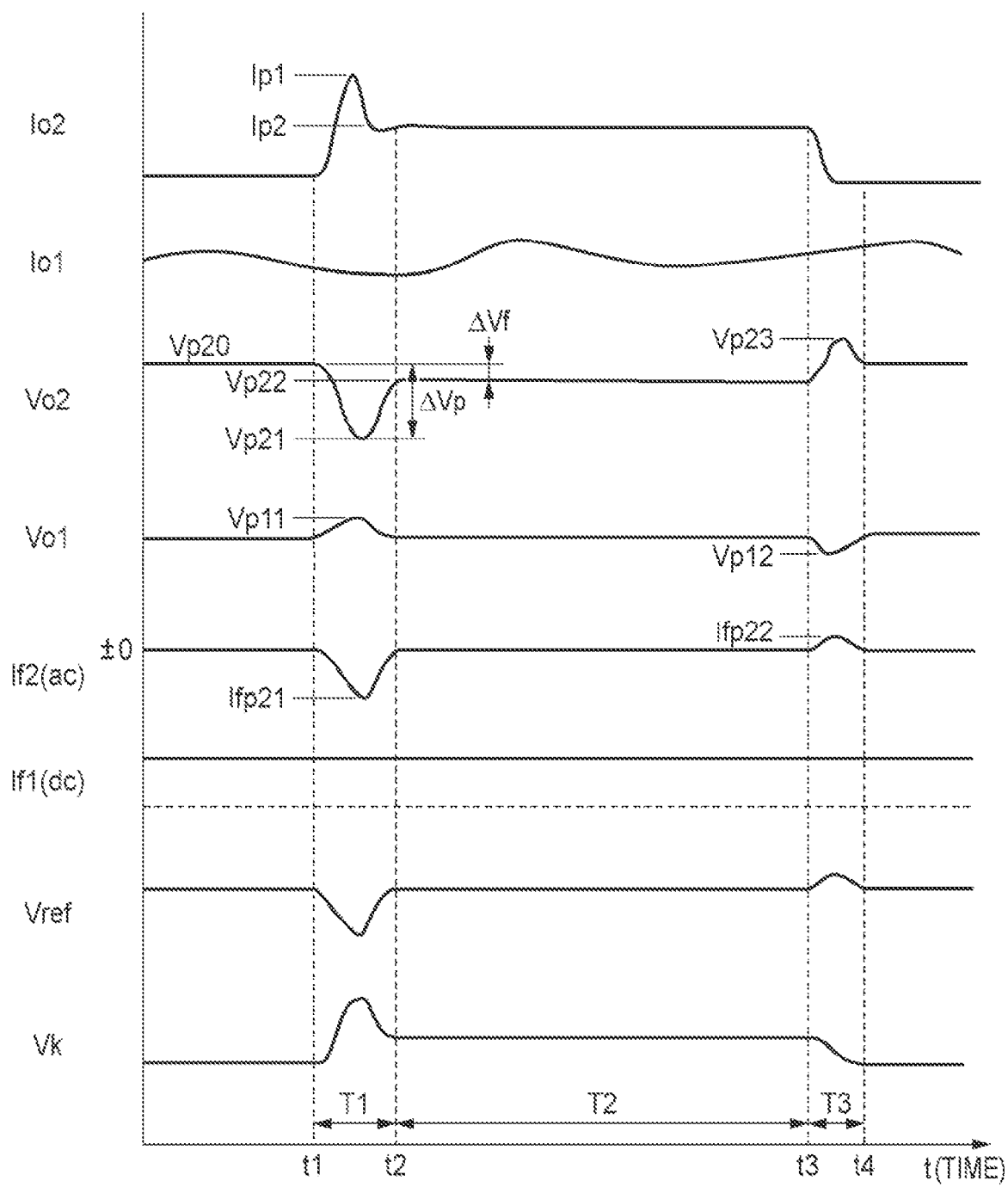
FIG. 13 is a signal waveform chart showing voltage and current waveforms of respective units in the switching power supply shown in FIG. 12.

In equation (25), the first term of the right-handed side includes Vo1 as a variable, the second term of the right-handed side includes the voltage increment ΔVs as a variable, and the third term of the right-handed side is a constant term. Therefore, if the output voltage Vo1 is stably maintained, a change of a feedback combined current If1(dc)+If2(dc) depends on ΔVS/R91. That is, as described above, in the conventional circuit shown in FIG. 12, since the feedback of the output Vo2 does not function in a stable region of the output Vo2 (the period T2 in FIG. 13), the voltage drop ΔVf (FIG. 6) of the output voltage Vo2 is large. By contrast, in the circuit shown in FIG. 4, the second term of the right-handed side in equation (25) is effective, and the feedback control effects in a direction to cancel variations of the output Vo2. Hence, in the stable region of the output Vo2, the voltage drop ΔVf of the output voltage Vo2 is suppressed to be small. This will be described later with reference to the signal waveform chart of voltage and current waveforms shown in FIG. 6.

According to equation (25), degrees of contribution of a change of the output Vo1 and that of the voltage increment ΔVs to feedback will be examined below. Letting α1 and α2 be their feedback factors, the following relations are satisfied, as given by:

$$\alpha 1 = 1/R6 + 1/R91$$

$$\alpha 2 = 1/R91 \qquad (26)$$

In this case, coefficients of the first and second terms of the right-handed side of equation (25) respectively correspond to α1 and α2. Therefore, a ratio of α1 to a total of the feedback factors, that is, a feedback contribution ratio D(α1) of the output Vo1 is calculated, as given by:

$$D(\alpha 1) = \alpha 1/(\alpha 1 + \alpha 2) = (1 + X)/(2 + X) \qquad (27)$$

for X=R91/R6

Likewise, a feedback contribution ratio D(α2) of the output Vo2 is given by:

$$D(\alpha 2) = \alpha 2/(\alpha 1 + \alpha 2) = 1/(2 + X) \qquad (28)$$

Figure 5:
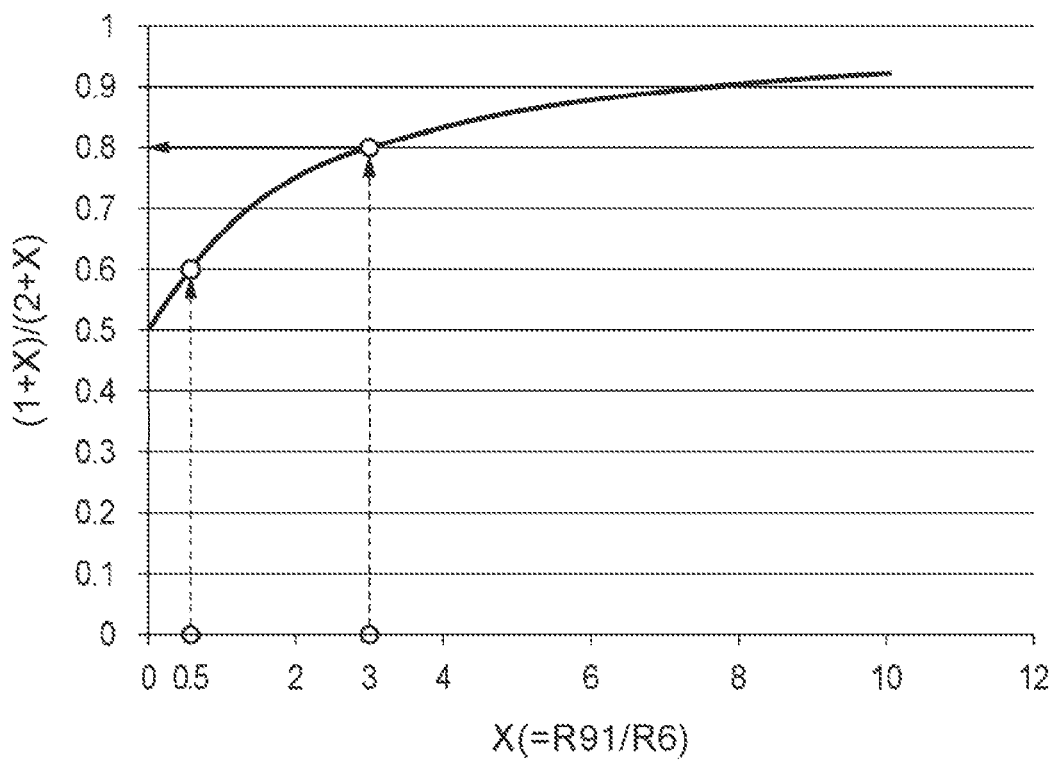
FIG. 5 is a graph showing the relationship between a parameter X and feedback contribution ratio.

FIG. 5 shows the result of equation (27).

FIG. 5 is a graph showing a change of the feedback contribution ratio D(α1) of the output Vo1.

As can be seen from FIG. 5, when X=0, the left-handed side of equation (27), that is, the feedback contribution ratio of Vo1 is 0.5. When X=3, the contribution ratio is 0.8. When X=8, the contribution ratio is 0.9. As X becomes larger, the contribution ratio is got closer to 1.0. According to experimental data related to this embodiment, it is revealed that when X=3, that is, when the feedback contribution ratio of Vo1 is 0.8, both the printhead driving voltage Vo1 and motor driving voltage Vo2 can be maintained and controlled with the best balance. This also indicates that the feedback contribution ratio of Vo2 is 0.2.

Figure 6:
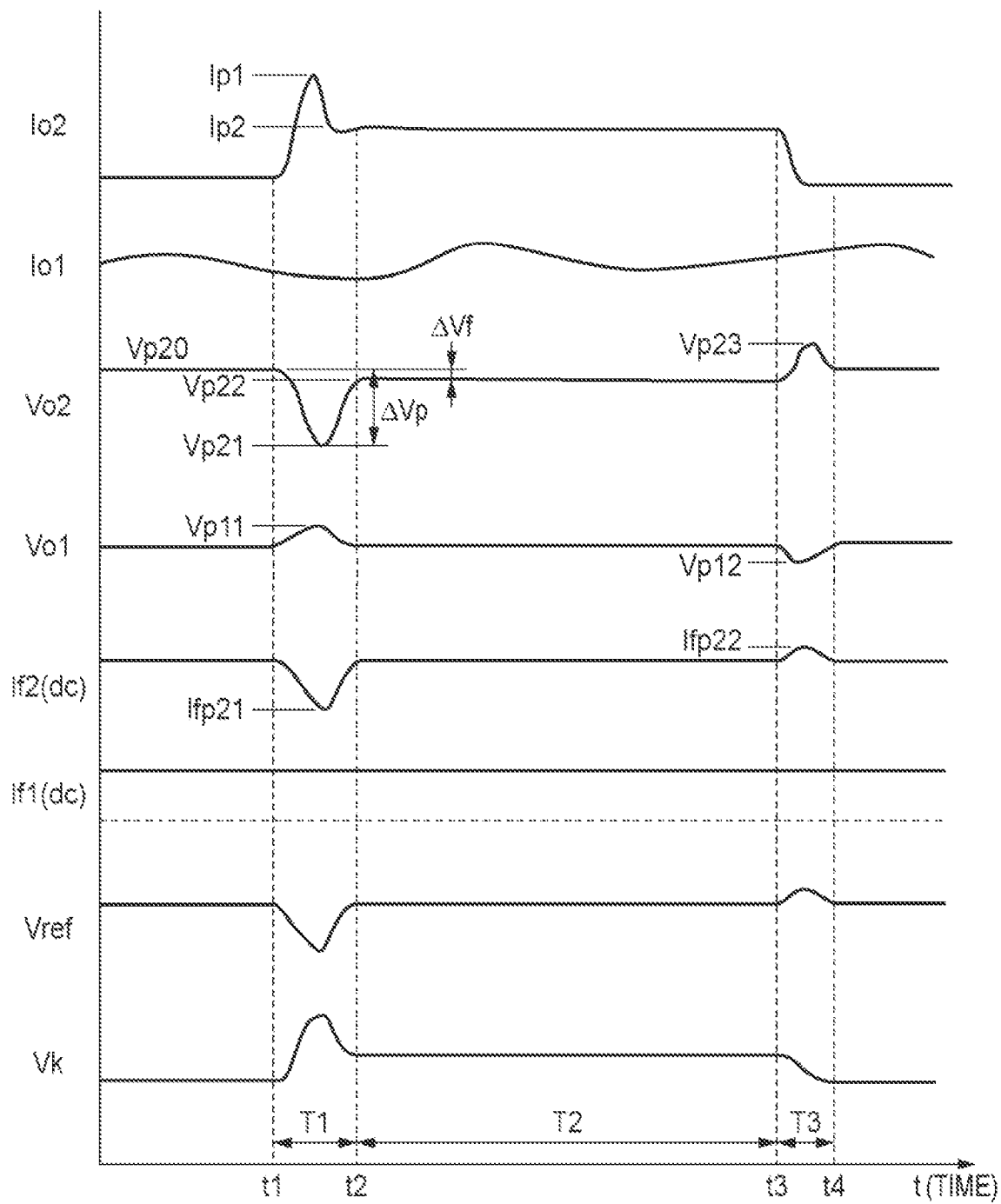
FIG. 6 is a waveform chart showing voltage and current waveforms of respective units in the circuit shown in FIG. 4.

FIG. 6 is a signal waveform chart showing voltage and current waveforms of the respective units in the switching power supply shown in FIG. 4. As can be seen from comparison between FIG. 6 and the related art shown in FIG. 13, a voltage level Vp22 after the second output voltage Vo2 is recovered at time t=t2 is only slightly lower than a level Vp20 before time t=t1. As has been described above with reference to FIG. 13, in this related art, the voltage drop ΔVf reaches 3 to 4 V, but it can be suppressed to about 1.0 V in the switching power supply shown in FIG. 4.

Therefore, according to the aforementioned embodiment, the voltage drop of the second output voltage used as the motor driving voltage can also be suppressed by the feedback control. Thus, the motor servo-control can be normally executed.

<Another Embodiment>

Note that the arrangement of the switching power supply is not limited to the aforementioned embodiment.

Figure 7:
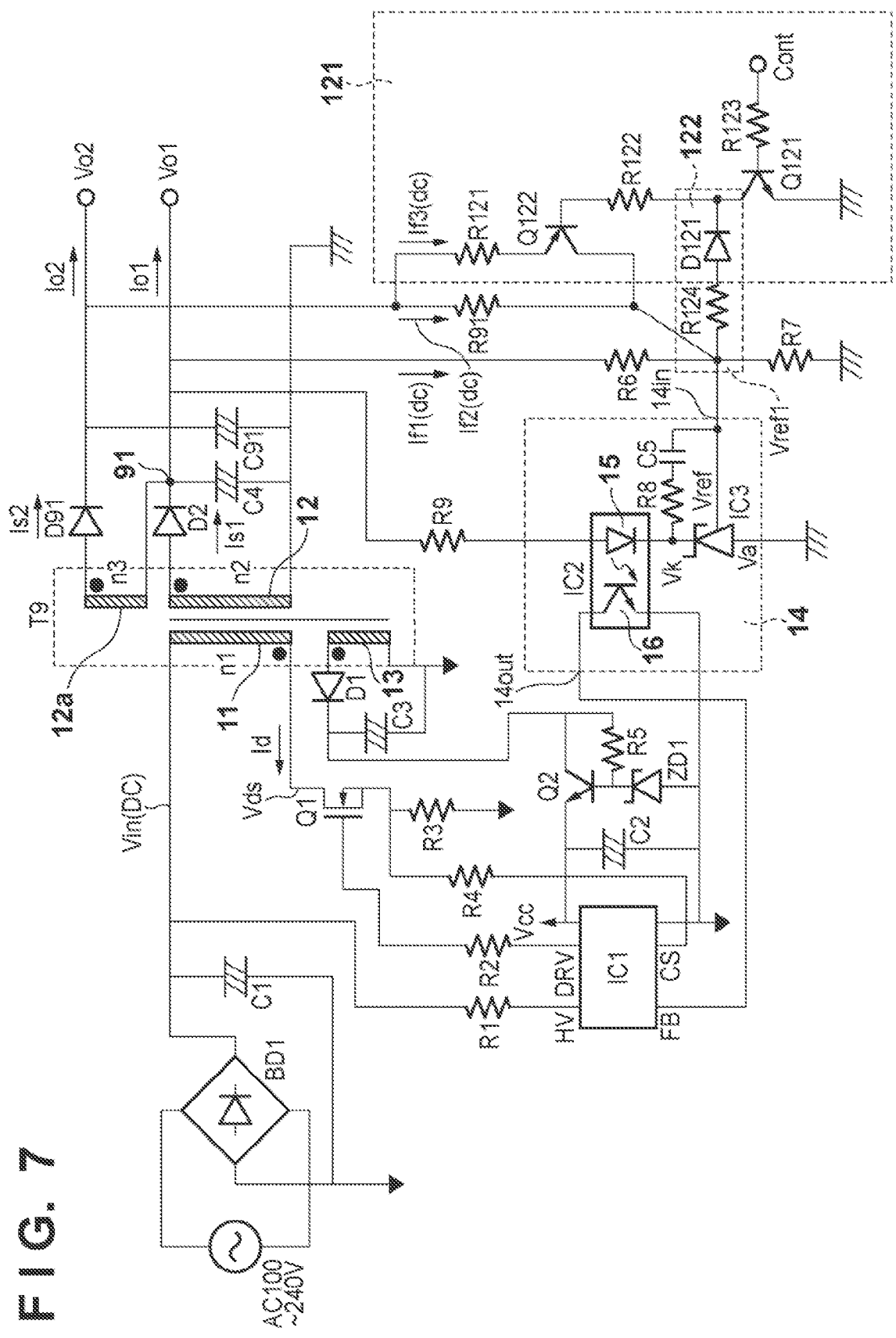
FIG. 7 is a circuit diagram showing the switching power supply according to the second embodiment of the present invention.

FIG. 7 is a circuit diagram showing the arrangement of a switching power supply according to another embodiment. The circuit according to this embodiment features that a block 121 (to be described in detail later) is added. Note that the same reference symbols or numerals in FIG. 7 denote the same elements as those in the already explained switching power supply shown in FIG. 4, and a description thereof will not be repeated.

The description will be continued with reference to FIG. 7. The block 121 functions to change the feedback factors $\alpha 1$ and $\alpha 2$ by a control signal Cont which is inputted to a base of a transistor Q121 via a resistor R123. When the control signal Cont is at low level, the transistor Q121 is disabled, and a subsequent transistor Q122 is consequently disabled. Hence, the block 121 does not influence the entire circuit. As a result, the feedback factors $\alpha 1$ and $\alpha 2$ assume values described with reference to FIG. 4, as given by equations (26).

On the other hand, when the control signal Cont is at high level, the transistor Q121 is enabled, and the transistor Q122 is consequently enabled. Hence, a feedback current If3(dc) flows via a resistor R121 to be parallel to the feedback current If2(dc) which flows through the resistor R91. As a result, a combined current of the currents If1(dc), If2(dc), and If3(dc) flows into the node Vref1. These currents are respectively given by:

$$If1(dc)=(Vo1-Vref)/R6 \tag{29}$$

$$If2(dc)=(Vo2-Vref)/R91 \tag{30}$$

$$If3(dc)=(Vo2-Vref)/R121 \tag{31}$$

Furthermore, as in the aforementioned embodiment, equation (32) holds. That is, we have:

$$Vo2=Vo1+\Delta Vs \tag{32}$$

Therefore, a combined current at the node Vref1 is calculated from these equations, as given by:

$$\begin{aligned} If1(dc) &+ If2(dc) + If3(dc) = \\ &(Vo1-Vref)/R6 + (Vo2-Vref)/R91 + (Vo2-Vref)/R91 = \\ &(1/R6 + 1/R91 + 1/R121)*Vo1 + \\ &(1/R91 + 1/R121)*\Delta Vs - (1/R6 + 1/R91 + 1/R121)*Vref \end{aligned} \tag{33}$$

In equation (33), the first term of the right-handed side includes Vo1 as a variable, the second term of the right-handed side includes the voltage increment $\Delta Vs$ as a variable, and the third term of the right-handed side is a constant term. Therefore, if the output voltage Vo1 is stably maintained, a change of the feedback combined current If1(dc)+If2(dc)+If3(dc) depends on the second term of the right-handed side, that is, $(1/R91+1/R121)*\Delta Vs$.

As can be seen from comparison between equation (33) and equation (25) described in association with FIG. 4, a coefficient of the variable $\Delta Vs$ becomes large. That is, the coefficient is 1/R91 in equation (25), while it is (1/R91+1/R121) in equation (33). Consequently, a change of the second term of the right-handed side becomes large with respect to a given change of the variable $\Delta Vs$. That is, the circuit shown in FIG. 7 can implement the feedback control which largely reflects the change of the output voltage Vo2 compared to that shown in FIG. 4.

In the circuit shown in FIG. 7, when the transistor Q121 is enabled, the total sum of the feedback currents If1(dc), If2 (dc), and If3(dc), which flow into the node Vref1, flows out via the resistor R7. Furthermore, in addition, the total sum current flows out to the transistor Q121 via a block 122 bounded by the broken line.

Note that the block 122 includes a series circuit of a resistor R124 and diode D121. The reason why this series circuit is required is as follows. That is, the control is made so that the total sum of currents which flow into the node Vref1 and that of currents which flow out from the node are equal to each other, and the potential of the node Vref1 is always maintained at DC 2.5 V. Therefore, since the transistor Q121 is enabled when the control signal Cont is high, a new current channel, which accommodates (in other words, which allows to flow out) an increment of the feedback currents which flow into the node Vref1, that is, If3(dc), has to be formed. The series circuit of the resistor R124 and diode D121 just corresponds to this current channel.

If this current channel is not formed, when the control signal Cont is high, the output voltages Vo1 and Vo2 fall below DC 24 V and DC 32 V as original setting voltages. That is, the levels of these output voltages change from the original output voltages. This is for the following reason. That is, the control is made so that the total sum of the feedback currents If1(dc), If2(dc), and If3(dc) equals to a current value which flows through the reference resistor R7, that is, a value (always constant) obtained by dividing DC 2.5 V by the resistance R7. For this reason, if the new current channel as the block 122 is not formed, both the variables Vo1 and $\Delta Vs$ in the right-handed side are controlled to be lower than the original setting voltages. In this connection, the diode D121 of the block 122 assumes a role of preventing the base current of the transistor Q122 from flowing into a node Vref1 via the resistors R122 and R124 to enable the transistor Q122 when the control signal Cont is low.

Furthermore, in FIG. 7, since the feedback current If3(dc) is required to be equal to a current which flows through the block 122 as the new current channel, as described above, the following relation holds, as given by:

$$If3(dc)=(Vref-Vf)/R124 \tag{34}$$

where Vref is a reference voltage (typically, DC 2.5 V) of the shunt regulator IC 3, Vf is a forward voltage (for example, 0.4 V in case of a Schottky diode) of the diode D121, and R124 is the resistance of the resistor R124. Furthermore, since the feedback current If3(dc) is given by equation (31), we have:

$$(Vo2-Vref)/R121=(Vref-Vf)/R124 \tag{35}$$

Hence, the value of the resistor R124 is calculated, as given by:

$$R124=\{(Vref-Vf)/(Vo2-Vref)\}*R121 \tag{36}$$

In this case, substitution of equation (22) to Vo2 yields:

$$R124=\{(Vref-Vf)/(Vo1+\Delta Vs-Vref)\}*R121 \tag{37}$$

As can be understood from the above description, if the feedback current If3(dc) is decided, the value of the resistor R124 in the block 122 can be calculated from the value of the resistor R121 related to the current If3(dc).

Next, when the feedback factor $\alpha 1$ of the output Vo1 and the feedback factor $\alpha 2$ of the output Vo2 are calculated from equation (33), we have:

$$\alpha 1=1/R6+1/R91+1/R121$$

$$\alpha 2=1/R91+1/R121 \tag{38}$$

Therefore, a ratio of $\alpha 1$ to the total of the feedback factors, that is, the feedback contribution ratio $D(\alpha 1)$ of the output Vo1 is calculated, as given by:

$$D(\alpha 1)=\alpha 1/(\alpha 1+\alpha 2)=(1+X')/(2+X') \tag{39}$$

for $X'=(R91//R121)/R6$ where R91//R121 means parallel resistances of R91 and R121. Likewise, the feedback contribution ratio $D(\alpha 2)$ of the output Vo2 is given by:

$$D(\alpha 2)=\alpha 2/(\alpha 1+\alpha 2)=1/(2+X') \tag{40}$$

In this case, the result of equation (40) is obtained by substituting X in equation (27) described in association with the aforementioned embodiment by X', and is given by substituting X in FIG. 5 by X' if it is expressed as a graph. However, in practice, X', that is, the numerator (R91//R121) of (R91//R121)/R6 cannot assume zero value. This is because the resistor R91 or R121 cannot assume zero resistance, that is, a short-circuited state. Experiments reveal that in case of, for example, the high-speed printing medium conveyance period of the conveyance motor M2, when X'=0.5, that is, when $D(\alpha1)=0.6$ and $D(\alpha2)=0.4$ from equations (39) and (40), a drop of the output voltage Vo2 can be suppressed and stably controlled. Please also refer to FIG. 5 for this point.

As has already been described above, in the conventional circuit shown in FIG. 14, since the feedback of the output Vo2 does not function in effect in a stable region (the period T2 in FIG. 13) of the output Vo2, the voltage drop $\Delta Vf$ of the output voltage Vo2 is large.

By contrast, in the circuit arrangement shown in FIG. 3, the output Vo2 is generated by superimposing the superimposing voltage $\Delta Vs$ on the output Vo1 with reference to the output Vo1, and the feedback control effects in a direction to cancel variations of this superimposing voltage $\Delta Vs$. For this reason, undershooting and overshooting of the output Vo2 can be reduced, and the voltage drop $\Delta Vf$ of the output Vo2 can be suppressed to be small even in its stable region (the period T2 in FIG. 6).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-147737, filed Jul. 1, 2011, which is hereby incorporated by reference herein in its entirety.

What is claimed is:

1. A apparatus comprising:
   a transformer having a primary winding, a first secondary winding, and a second secondary winding;
   a first DC voltage generation unit configured to generate a first DC voltage from a voltage generated by the first secondary winding;
   a second DC voltage generation unit configured to generate a second DC voltage from a voltage obtained by adding a voltage generated by the second secondary winding on the first DC voltage;
   a switching unit configured to energize the primary winding;
   a control unit, including a voltage input node, configured to control the switching unit so that a voltage input to the voltage input node becomes constant such that the first DC voltage and the second DC voltage are fed back with feedback factors corresponding to degrees of contribution of the first DC voltage and the second DC voltage to feedback control, the voltage input node being connected to an output node of the first DC voltage generation unit and an output node of the second DC voltage generation unit via resistors, respectively; and
   a change unit configured to receive change an input control signal and relatively change the feedback factors according to the input control signal.

2. The apparatus according to claim 1, wherein letting R6 be a resistance of a first resistor connected to the output node of the first DC voltage generation unit, R91 be a resistance of a second resistor connected to the output node of the second DC voltage generation unit, $\alpha1$ be a feedback factor for the feedback of the first DC voltage, and $\alpha2$ be a feedback factor for the feedback of the second DC voltage, the feedback factor $\alpha1$ and the feedback factor $\alpha2$ are respectively given by:

$$\alpha1=1/R6+1/R91$$

$$\alpha2=1/R91.$$

3. A printing apparatus comprising:
   an apparatus according to claim 1;
   a printhead supplied with the first DC voltage;
   a motor supplied with the second DC voltage; and
   a second control unit configured to control the printhead and the motor.

4. The apparatus according to claim 1, wherein the first DC voltage is supplied to a printhead, and the second DC voltage is supplied to a motor.

5. A printing apparatus including a printhead and a motor, wherein the apparatus comprises a switching power supply configured to generate a first output voltage required to drive the printhead and a second output voltage, higher than the first output voltage, required to drive the motor, and
   the switching power supply comprises:
   a transformer configured to generate the first output voltage by a first secondary winding and to generate an adding voltage to be added on the first output voltage by a second secondary winding;
   a driver configured to drive the transformer;
   an adder configured to add the adding voltage to the first output voltage to output the second output voltage; and
   a feedback control unit configured to feed back the first output voltage and the second output voltage respectively by DC coupling, with a first feedback factor and a second feedback factor, respectively, to combine the fed-back first output voltage and the fed-back second output voltage, and to apply a PWM control signal to the driver based on the combined fed-back first output voltage and fed-back second output voltage.

6. The apparatus according to claim 5, wherein letting R6 be a resistor series-connected to the first output voltage, R91 be a resistor series-connected to the second output voltage, $\alpha1$ be the first feedback factor, and $\alpha2$ be the second feedback factor, the first feedback factor $\alpha1$ and the second feedback factor $\alpha2$ are respectively given by:

$$\alpha1=1/R6+1/R91$$

$$\alpha2=1/R91$$

and, when X=R91/R6, a feedback contribution ratio $D(\alpha1)$ of the first output voltage and a feedback contribution ratio $D(\alpha2)$ of the second output voltage are respectively given by:

$$D(\alpha1)=\alpha1/(\alpha1+\alpha2)=(1+X)/(2+X)$$

$$D(\alpha2)=\alpha2/(\alpha1+\alpha2)=1/(2+X).$$

7. The apparatus according to claim 6, wherein the feedback control unit comprises a change unit configured to change at least one of the first feedback factor and the second feedback factor according to an input control signal in accordance with a print operation sequence of the printing apparatus, and
   the change unit changes a resistance of at least one of the resistor R6 and the resistor R91.

8. The apparatus according to claim 5, wherein the feedback control unit comprises a change unit configured to change at least one of the first feedback factor and the second feedback factor according to an input control signal in accordance with a print operation sequence of the printing apparatus.

9. The apparatus according to claim 8, wherein the change unit increases the first feedback factor in a driving period of the printhead, and increases the second feedback factor in a conveyance period of a printing medium in the print operation sequence.

10. The apparatus according to claim 9, wherein $D(\alpha 1)=0.8$ and $D(\alpha 2)=0.2$ during the driving period of the printhead, and $D(\alpha 1)=0.6$ and $D(\alpha 2)=0.4$ during the conveyance period of the printing medium.

11. The apparatus according to claim 5, further comprising:
    a first rectifying and smoothing circuit configured to rectify and smooth the first output voltage; and
    a second rectifying and smoothing circuit configured to rectify and smooth the adding voltage, wherein
    the adder adds the adding voltage rectified and smoothed by the second rectifying and smoothing circuit to the first output voltage rectified and smoothed by the first rectifying and smoothing circuit to output the second output voltage.

12. The apparatus according to claim 5, wherein the first feedback factor and the second feedback factor are adjusted by resistors, respectively.

13. The apparatus according to claim 5, wherein the first feedback factor and the second feedback factor are variably controllable based on a control signal.

14. A voltage adjustment method applied to an apparatus including: a transformer having a primary winding, a first secondary winding, and a second secondary winding; a first DC voltage generation unit configured to generate a first DC voltage; a second DC voltage generation unit configured to generate a second DC voltage; a switching unit configured to energize the primary winding; and a control unit, including a voltage input node, configured to control the switching unit, the method comprising:
    generating the first DC voltage from a voltage generated by the first secondary winding;
    generating the second DC voltage from a voltage obtained by adding a voltage generated by the second secondary winding on the first DC voltage;
    connecting the voltage input node to an output node of the first DC voltage generation unit and an output node of the second DC voltage generation unit via resistors, respectively;
    controlling the switching unit so that a voltage input to the voltage input node becomes constant such that the first DC voltage and the second DC voltage are fed back with feedback factors corresponding to degrees of contribution of the first DC voltage and the second DC voltage to feedback control; and
    relatively changing the feedback factors according to an input control signal.

15. A feedback control method applied to a printing apparatus including a printhead and a motor, wherein the apparatus comprises a switching power supply configured to generate a first output voltage required to drive the printhead and a second output voltage, higher than the first output voltage, required to drive the motor, and the switching power supply comprising: a transformer configured to generate the first output voltage by a first secondary winding and an adding output voltage by a second secondary winding; and a driver configured to drive the transformer, the method comprising:
    adding the adding voltage to the first output voltage to output the second output voltage;
    feeding back the first output voltage and the second output voltage respectively by DC coupling with
    a first feedback factor and a second feedback factor, respectively;
    combining the fed-back first output voltage and the fed-back seconed output voltage; and
    applying a PWM control signal to the driver by the combined fed-back first output voltage and fed-back second output voltage.

* * * * *